(12) United States Patent
Bilchinsky et al.

(10) Patent No.: US 10,405,380 B2
(45) Date of Patent: Sep. 3, 2019

(54) DEVICE AND METHOD FOR HEATING USING RF ENERGY

(71) Applicant: Goji Limited, Hamilton (BM)

(72) Inventors: Alexander Bilchinsky, Monosson-Yahud (IL); Eran Ben-Shmuel, Savyon (IL); Daniella Atzmony, Shoham (IL); Pinchas Einziger, Haifa (IL); Amit Rappel, Ofra (IL)

(73) Assignee: GOJI LIMITED, Hamilton (BM)

( * ) Notice: Subject to any disclaimer, the term of this patent is extended or adjusted under 35 U.S.C. 154(b) by 357 days.

(21) Appl. No.: 15/283,805

(22) Filed: Oct. 3, 2016

(65) Prior Publication Data

US 2017/0027026 A1    Jan. 26, 2017

Related U.S. Application Data

(63) Continuation of application No. 13/508,932, filed as application No. PCT/IL2010/000381 on May 12, 2010, now Pat. No. 9,462,635.

(Continued)

(30) Foreign Application Priority Data

Nov. 10, 2009   (WO) .................. PCT/IL2009/001058

(51) Int. Cl.
*H05B 6/64* (2006.01)
*H05B 6/68* (2006.01)
(Continued)

(52) U.S. Cl.
CPC .............. *H05B 6/705* (2013.01); *H05B 1/02* (2013.01); *H05B 6/00* (2013.01); *H05B 6/6447* (2013.01);
(Continued)

(58) Field of Classification Search
None
See application file for complete search history.

(56) References Cited

U.S. PATENT DOCUMENTS 2,489,337 A   11/1949   Sperling
2,543,130 A    2/1951   Robertson
(Continued)

FOREIGN PATENT DOCUMENTS

CN        1968609        5/2007
DE      102007025245    10/2007
(Continued)

OTHER PUBLICATIONS

Communication dated Mar. 21, 2012, regarding European Application No. 10 829 615.3, 3 pages.
(Continued)

*Primary Examiner* — Joseph M Pelham
(74) *Attorney, Agent, or Firm* — Finnegan, Henderson, Farabow, Garrett & Dunner, LLP

(57) ABSTRACT

An apparatus for applying EM energy to a load may include at least one processor configured to receive information indicative of dissipated energy for each of a plurality of modulation space elements and group a number of the plurality of modulations space elements into at least two subsets based on the information received indicative of dissipated energy. The processor may also be configured to associate a power delivery protocol with each of the at least two subsets wherein the power delivery protocol differs between subsets and regulate energy applied to the load in accordance with each power delivery protocol.

20 Claims, 15 Drawing Sheets

Related U.S. Application Data

(60) Provisional application No. 61/282,980, filed on May 3, 2010, provisional application No. 61/282,981, filed on May 3, 2010, provisional application No. 61/282,983, filed on May 3, 2010.

(51) Int. Cl.
  H05B 6/80 (2006.01)
  H05B 6/70 (2006.01)
  H05B 1/02 (2006.01)
  H05B 6/00 (2006.01)
  H05B 6/72 (2006.01)

(52) U.S. Cl.
  CPC ............ H05B 6/6455 (2013.01); H05B 6/68 (2013.01); H05B 6/686 (2013.01); H05B 6/687 (2013.01); H05B 6/688 (2013.01); H05B 6/70 (2013.01); H05B 6/72 (2013.01); H05B 2206/044 (2013.01); Y02B 40/143 (2013.01); Y02B 40/146 (2013.01)

(56) References Cited

U.S. PATENT DOCUMENTS

| | | | |
|---|---|---|---|
| 2,593,067 A | 4/1952 | Spencer | |
| 2,895,828 A | 7/1959 | Kamide | |
| 2,917,739 A | 12/1959 | Halpern | |
| 3,019,399 A | 1/1962 | Lanciani et al. | |
| 3,151,325 A | 9/1964 | Kompfner | |
| 3,231,892 A | 1/1966 | Matson et al. | |
| 3,633,538 A | 1/1972 | Hoeflin | |
| 3,681,652 A | 8/1972 | Domenichini et al. | |
| 3,767,884 A | 10/1973 | Osepchuk et al. | |
| 3,806,689 A * | 4/1974 | Kegereis | H05B 6/6402 219/697 |
| 3,936,627 A | 2/1976 | Fitzmayer | |
| 3,985,993 A | 10/1976 | Imberg et al. | |
| 4,035,599 A | 7/1977 | Kashyap | |
| 4,081,647 A | 3/1978 | Torrey | |
| 4,137,441 A | 1/1979 | Bucksbaum | |
| 4,146,768 A | 3/1979 | Orke et al. | |
| 4,165,454 A | 8/1979 | Carlsson et al. | |
| 4,196,332 A * | 4/1980 | MacKay | H05B 6/68 219/709 |
| 4,210,795 A | 7/1980 | Lentz | |
| 4,250,628 A | 2/1981 | Smith et al. | |
| 4,279,722 A | 7/1981 | Kirkbride | |
| 4,336,435 A | 6/1982 | Kashyap et al. | |
| 4,342,035 A | 7/1982 | Anderson et al. | |
| 4,342,896 A | 8/1982 | Teich | |
| 4,354,153 A | 10/1982 | Lentz | |
| 4,371,770 A | 2/1983 | Gilliatt | |
| 4,377,733 A | 3/1983 | Yamaguchi et al. | |
| 4,415,789 A * | 11/1983 | Nobue | H05B 6/6435 219/709 |
| 4,418,262 A | 11/1983 | Noda | |
| 4,431,888 A | 2/1984 | Simpson | |
| 4,447,693 A | 5/1984 | Buck | |
| 4,464,554 A | 8/1984 | Bakanowski et al. | |
| 4,471,194 A | 9/1984 | Hosokawa et al. | |
| 4,475,024 A | 10/1984 | Tateda | |
| 4,485,285 A | 11/1984 | Machesne | |
| 4,488,027 A | 12/1984 | Dudley et al. | |
| 4,507,530 A | 3/1985 | Smith | |
| 4,508,948 A | 4/1985 | Carlson | |
| 4,517,429 A | 5/1985 | Horinouchi | |
| 4,568,810 A | 2/1986 | Carmean | |
| 4,596,915 A | 6/1986 | Simpson | |
| 4,602,141 A | 7/1986 | Naito et al. | |
| 4,695,694 A | 9/1987 | Hill et al. | |
| 4,794,218 A | 12/1988 | Nakano et al. | |
| 4,822,968 A | 4/1989 | Chin | |
| 4,855,555 A | 8/1989 | Adams | |
| 4,897,151 A | 1/1990 | Killackey et al. | |
| 4,931,798 A | 6/1990 | Kogo | |
| 4,939,331 A * | 7/1990 | Berggren | H05B 6/666 219/716 |
| 5,008,506 A * | 4/1991 | Asmussen | H05B 6/52 219/696 |
| 5,036,171 A | 7/1991 | Kim et al. | |
| 5,036,172 A | 7/1991 | Kokkeler et al. | |
| 5,066,503 A | 11/1991 | Ruozi | |
| 5,074,200 A | 12/1991 | Ruozi | |
| 5,146,059 A | 9/1992 | Seog Tae | |
| 5,191,182 A | 3/1993 | Galorme et al. | |
| 5,202,095 A | 4/1993 | Houchin et al. | |
| 5,293,019 A | 3/1994 | Lee | |
| 5,321,222 A * | 6/1994 | Bible | H05B 6/686 219/745 |
| 5,321,897 A | 6/1994 | Hoist et al. | |
| 5,451,751 A | 9/1995 | Takimoto | |
| 5,468,940 A | 11/1995 | Kang | |
| 5,512,736 A | 4/1996 | Kang et al. | |
| 5,521,360 A * | 5/1996 | Johnson | H05B 6/686 219/709 |
| 5,558,800 A | 9/1996 | Page | |
| 5,616,268 A | 4/1997 | Carr | |
| 5,632,921 A | 5/1997 | Risman et al. | |
| 5,698,128 A | 12/1997 | Sakai et al. | |
| 5,721,286 A | 2/1998 | Lauf et al. | |
| 5,789,724 A | 8/1998 | Lerssen et al. | |
| 5,798,395 A | 8/1998 | Lauf et al. | |
| 5,804,801 A | 9/1998 | Lauf et al. | |
| 5,812,393 A | 9/1998 | Drucker | |
| 5,818,649 A | 10/1998 | Anderson | |
| 5,828,040 A | 10/1998 | Risman | |
| 5,828,042 A | 10/1998 | Choi et al. | |
| 5,834,744 A | 11/1998 | Risman | |
| 5,873,254 A | 2/1999 | Arav | |
| 5,877,479 A | 3/1999 | Yu | |
| 5,883,801 A | 3/1999 | Drucker et al. | |
| 5,927,265 A | 7/1999 | McKee et al. | |
| 5,942,144 A | 8/1999 | Lee | |
| 5,958,278 A | 9/1999 | Engebritson et al. | |
| 5,961,871 A * | 10/1999 | Bible | H05B 6/686 219/709 |
| 5,977,532 A | 11/1999 | Ekemar | |
| 5,981,927 A | 11/1999 | Osepchuk et al. | |
| 5,981,928 A | 11/1999 | Lee | |
| 5,986,249 A | 11/1999 | Yoshino et al. | |
| 5,998,775 A | 12/1999 | Sung | |
| 6,060,701 A | 5/2000 | McKee et al. | |
| 6,096,361 A | 8/2000 | Yamane et al. | |
| 6,104,018 A | 8/2000 | Varma et al. | |
| 6,114,677 A | 9/2000 | Idomoto et al. | |
| 6,166,551 A | 12/2000 | Scott et al. | |
| 6,169,277 B1 | 1/2001 | Feher et al. | |
| 6,172,348 B1 | 1/2001 | Yoshino et al. | |
| 6,191,402 B1 | 2/2001 | Ekemar | |
| 6,225,940 B1 | 5/2001 | Ohlsen | |
| 6,249,710 B1 | 6/2001 | Drucker et al. | |
| 6,252,206 B1 | 6/2001 | Leukhardt, III et al. | |
| 6,262,406 B1 | 7/2001 | McKee et al. | |
| 6,263,830 B1 | 7/2001 | Kamarehi et al. | |
| 6,274,859 B1 | 8/2001 | Yoshino et al. | |
| 6,320,165 B1 | 11/2001 | Ovadia | |
| 6,320,171 B1 | 11/2001 | Kim | |
| 6,384,392 B1 | 5/2002 | Lee et al. | |
| 6,444,966 B2 | 9/2002 | Mukumoto et al. | |
| 6,462,320 B1 | 10/2002 | Fuls et al. | |
| 6,476,766 B1 | 11/2002 | Cohen | |
| 6,487,950 B2 | 12/2002 | Samland | |
| 6,537,492 B1 | 3/2003 | Sogaard | |
| 6,563,097 B2 | 5/2003 | Taino et al. | |
| 6,576,879 B1 | 6/2003 | Hoh | |
| 6,586,714 B2 | 7/2003 | Kawamura et al. | |
| 6,590,192 B2 | 7/2003 | Taino et al. | |
| 6,614,011 B2 | 9/2003 | Omori et al. | |
| 6,657,173 B2 | 12/2003 | Flugstad et al. | |
| 6,674,056 B2 | 1/2004 | Lee | |
| 6,680,467 B1 * | 1/2004 | Whipple, Jr. | H05B 6/6402 219/697 |
| 6,686,567 B1 | 2/2004 | Hwang | |

(56) References Cited

U.S. PATENT DOCUMENTS

| | | | |
|---|---|---|---|
| 6,720,541 B2 | 4/2004 | Watanabe et al. |
| 6,770,859 B2 | 8/2004 | Kang |
| 6,812,442 B2 | 11/2004 | Kim et al. |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Torngren et al. |
| 6,914,226 B2 | 7/2005 | Ottaway |
| 6,927,374 B2 | 8/2005 | Hu et al. |
| 6,982,401 B2 | 1/2006 | Hu et al. |
| 7,015,443 B2 | 3/2006 | Whipple, Jr. |
| 7,030,347 B2 | 4/2006 | Lee et al. |
| 7,053,346 B2 | 5/2006 | Cheng et al. |
| 7,053,348 B1 | 5/2006 | Terada et al. |
| 7,055,518 B2 | 6/2006 | McFadden et al. |
| 7,078,661 B2 | 7/2006 | Kim et al. |
| 7,080,593 B1 | 7/2006 | Frankel |
| 7,087,872 B1 | 8/2006 | Dobie et al. |
| 7,091,460 B2 | 8/2006 | Kinzer |
| 7,105,787 B2 | 9/2006 | Clemen, Jr. |
| 7,105,789 B2 | 9/2006 | Ekemar |
| 7,109,457 B2 | 9/2006 | Kinzer |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,207,486 B1 | 4/2007 | Bennett |
| 7,208,710 B2 | 4/2007 | Gregoire et al. |
| 7,235,763 B2 | 6/2007 | Christiaansen et al. |
| 7,258,881 B2 | 8/2007 | Jones et al. |
| 7,360,533 B2 | 4/2008 | McFadden |
| 7,361,866 B2 | 4/2008 | Chun |
| 7,388,180 B2 | 6/2008 | Kim et al. |
| 7,409,311 B2 | 8/2008 | Imgram et al. |
| 7,473,869 B2 | 1/2009 | Chun |
| 7,490,538 B2 | 2/2009 | Lowell et al. |
| 7,520,244 B2 | 4/2009 | Yamagishi et al. |
| 7,612,315 B2 | 11/2009 | Corradini |
| 7,626,468 B2 | 12/2009 | Staines |
| 7,629,921 B1 | 12/2009 | Manry et al. |
| 7,994,962 B1* | 8/2011 | Ben-Shmuel | H01Q 19/18 342/13 |
| 8,207,479 B2* | 6/2012 | Ben-Shmuel | H05B 6/647 219/704 |
| 8,389,916 B2* | 3/2013 | Ben-Shmuel | A23L 3/01 219/687 |
| 8,759,729 B2 | 6/2014 | Ben-Shmuel et al. |
| 2001/0020616 A1 | 9/2001 | Drozd et al. |
| 2002/0018138 A1 | 2/2002 | Yoshiro |
| 2003/0047559 A1 | 3/2003 | Watanabe et al. |
| 2003/0068414 A1 | 4/2003 | Ito |
| 2003/0183972 A1 | 10/2003 | Weber et al. |
| 2004/0074401 A1 | 4/2004 | McMaster et al. |
| 2004/0134904 A1 | 7/2004 | Clemen, Jr. |
| 2004/0211765 A1 | 10/2004 | McFadden |
| 2004/0216732 A1 | 11/2004 | McFadden |
| 2005/0080373 A1 | 4/2005 | Wang |
| 2005/0092314 A1 | 5/2005 | Rabas et al. |
| 2005/0092844 A1 | 5/2005 | Zhang et al. |
| 2005/0139686 A1 | 6/2005 | Helmer et al. |
| 2005/0178841 A1 | 8/2005 | Jones, II et al. |
| 2006/0006173 A1 | 1/2006 | Kim et al. |
| 2006/0049725 A1 | 3/2006 | Simon |
| 2006/0107716 A1 | 5/2006 | Dykstra et al. |
| 2006/0186115 A1 | 8/2006 | Joines et al. |
| 2006/0259547 A1 | 11/2006 | Bogatin et al. |
| 2006/0278710 A1 | 12/2006 | Park et al. |
| 2006/0289508 A1 | 12/2006 | Kim |
| 2006/0289526 A1 | 12/2006 | Takizaki |
| 2007/0007279 A1 | 1/2007 | Chun et al. |
| 2007/0007348 A1 | 1/2007 | Shah |
| 2007/0012690 A1 | 1/2007 | Sim et al. |
| 2007/0012789 A1 | 1/2007 | Hartney et al. |
| 2007/0039940 A1 | 2/2007 | Kim et al. |
| 2007/0039949 A1 | 2/2007 | Wilson |
| 2007/0137633 A1 | 6/2007 | McFadden |
| 2007/0215608 A1 | 9/2007 | Yoshino et al. |
| 2007/0215612 A1 | 9/2007 | Hicks et al. |
| 2007/0251941 A1 | 11/2007 | Givens |
| 2007/0272684 A1 | 11/2007 | Lee |
| 2007/0278218 A1 | 12/2007 | Claesson et al. |
| 2008/0047948 A1 | 2/2008 | Rosenbloom et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | McFadden et al. |
| 2008/0160967 A1 | 7/2008 | Narasimhan et al. |
| 2008/0193614 A1 | 8/2008 | Greiner et al. |
| 2008/0206420 A1 | 8/2008 | McFadden |
| 2008/0264269 A1 | 10/2008 | Sterzel et al. |
| 2008/0280000 A1 | 11/2008 | Breunig et al. |
| 2008/0290087 A1* | 11/2008 | Ben-Shmuel | A23L 3/01 219/748 |
| 2008/0296284 A1 | 12/2008 | McFadden et al. |
| 2009/0014315 A1 | 1/2009 | Chen |
| 2009/0045191 A1* | 2/2009 | Ben-Shmuel | H05B 6/647 219/746 |
| 2009/0057302 A1* | 3/2009 | Ben-Shmuel | H05B 6/72 219/748 |
| 2009/0071110 A1 | 3/2009 | Gonze et al. |
| 2009/0236333 A1* | 9/2009 | Ben-Shmuel | H05B 6/6402 219/702 |
| 2009/0236334 A1* | 9/2009 | Ben-Shmuel | B65D 81/3453 219/703 |
| 2009/0236335 A1* | 9/2009 | Ben-Shmuel | H05B 6/6402 219/710 |
| 2009/0256706 A1 | 10/2009 | Brown |
| 2009/0274802 A1 | 11/2009 | Kling et al. |
| 2009/0321427 A1 | 12/2009 | Hyde et al. |
| 2010/0123001 A1 | 5/2010 | Park |
| 2010/0155392 A1 | 6/2010 | Nordh et al. |
| 2010/0176121 A1* | 7/2010 | Nobue | H05B 6/686 219/716 |
| 2010/0176123 A1* | 7/2010 | Mihara | H05B 6/686 219/746 |
| 2010/0224623 A1* | 9/2010 | Yasui | H05B 6/686 219/702 |
| 2010/0237067 A1 | 9/2010 | Nordh et al. |
| 2010/0252551 A1 | 10/2010 | Nordh et al. |
| 2011/0108548 A1* | 5/2011 | Nobue | H05B 6/6402 219/702 |
| 2011/0168699 A1* | 7/2011 | Oomori | H01L 21/67115 219/748 |
| 2011/0198343 A1* | 8/2011 | Bilchinsky | H05B 6/688 219/678 |
| 2011/0204043 A1* | 8/2011 | Ishizaki | H05B 6/705 219/647 |
| 2012/0067872 A1* | 3/2012 | Libman | H05B 6/647 219/702 |
| 2012/0103972 A1 | 5/2012 | Okajima |
| 2012/0152940 A1* | 6/2012 | Oomori | H05B 6/686 219/702 |
| 2013/0008896 A1* | 1/2013 | Oomori | H05B 6/686 219/756 |
| 2013/0062334 A1* | 3/2013 | Bilchinsky | H05B 6/705 219/482 |
| 2013/0080098 A1 | 3/2013 | Hadad |
| 2013/0146590 A1* | 6/2013 | Einziger | H05B 6/64 219/709 |
| 2013/0206749 A1 | 8/2013 | Libman |
| 2014/0063676 A1* | 3/2014 | Sigalov | H05B 6/645 361/143 |

FOREIGN PATENT DOCUMENTS

| | | |
|---|---|---|
| DE | 102007025262 | 10/2007 |
| DE | 102007025263 | 10/2007 |
| DE | 102007025264 | 10/2007 |

(56) References Cited

FOREIGN PATENT DOCUMENTS

| | | |
|---|---|---|
| DE | 102007035357 | 2/2009 |
| DE | 102007035359 | 2/2009 |
| DE | 102007051638 | 8/2009 |
| EP | 0268379 | 5/1988 |
| EP | 0429822 | 6/1991 |
| EP | 0615763 | 9/1994 |
| EP | 0752195 | 1/1997 |
| EP | 0934681 | 8/1999 |
| EP | 1447632 | 8/2004 |
| EP | 1 471 773 A2 | 10/2004 |
| EP | 1515102 | 3/2005 |
| EP | 1708118 A2 | 10/2006 |
| EP | 2051564 A1 | 4/2009 |
| EP | 2053315 | 4/2009 |
| EP | 2098788 | 9/2009 |
| EP | 2 182 774 A1 | 5/2010 |
| EP | 2 205 043 A1 | 7/2010 |
| EP | 2 306 785 A1 | 4/2011 |
| EP | 2 326 142 A1 | 5/2011 |
| EP | 2 499 880 B1 | 3/2017 |
| GB | 1465106 | 2/1997 |
| GB | 2391154 | 1/2004 |
| JP | 55-151096 U | 4/1979 |
| JP | 55-49632 U | 4/1980 |
| JP | S55-151096 | 11/1980 |
| JP | 63-255783 A | 10/1988 |
| JP | 04-299282 | 8/1992 |
| JP | 06193884 | 7/1994 |
| JP | 06-215871 | 8/1994 |
| JP | 06-251866 | 9/1994 |
| JP | 06310268 | 11/1994 |
| JP | 08064359 | 3/1996 |
| JP | 52-014946 | 2/1997 |
| JP | 09229372 | 9/1997 |
| JP | 2001-086967 | 4/2001 |
| JP | 2002-37420 A1 | 2/2002 |
| JP | 2002-243161 A1 | 8/2002 |
| JP | 2004-171852 | 6/2004 |
| JP | 2005-228604 | 8/2005 |
| JP | 2008-310969 A | 12/2008 |
| JP | 2009-527883 | 7/2009 |
| WO | WO 1991/070069 | 5/1991 |
| WO | WO 1995/027387 | 10/1995 |
| WO | WO 1995/027388 | 10/1995 |
| WO | WO 1997/036728 | 10/1997 |
| WO | WO 1999/013688 | 3/1999 |
| WO | WO 2002/023953 | 3/2002 |
| WO | WO 2003/056919 | 7/2003 |
| WO | WO 2004/054705 A1 | 7/2004 |
| WO | WO 2004/059563 | 7/2004 |
| WO | WO 2005/027644 | 3/2005 |
| WO | WO 2005/041672 | 5/2005 |
| WO | WO 2005/073449 | 8/2005 |
| WO | WO 2005/106333 | 11/2005 |
| WO | WO 2006/016372 | 2/2006 |
| WO | WO 2007/018565 | 2/2007 |
| WO | WO 2007/095904 | 8/2007 |
| WO | WO 2007/096877 | 8/2007 |
| WO | WO 2007/096878 | 8/2007 |
| WO | WO 2008/007368 | 1/2008 |
| WO | WO 2008/048497 | 4/2008 |
| WO | WO 2008/087618 | 7/2008 |
| WO | WO 2008/102334 | 8/2008 |
| WO | WO 2008/102360 | 8/2008 |
| WO | WO 2009/050893 A1 | 10/2008 |
| WO | WO 2008/143942 | 11/2008 |
| WO | WO 2008/145213 | 12/2008 |
| WO | WO 2008/145214 | 12/2008 |
| WO | WO 2008/145216 | 12/2008 |
| WO | WO 2008/145217 | 12/2008 |
| WO | WO 2009/011111 A1 | 1/2009 |
| WO | WO 2009/080344 | 7/2009 |
| WO | WO 2009/104191 A2 | 8/2009 |
| WO | WO 2009/157110 A1 | 12/2009 |
| WO | WO 2010/032345 A1 | 3/2010 |
| WO | WO 2010/052725 | 5/2010 |
| WO | WO 2010/147439 A2 | 12/2010 |
| WO | WO 2011/058538 A1 | 5/2011 |

OTHER PUBLICATIONS

Sinclair et al., "Focussed Microwave Heating Using Degenerate and Non-Degenerate Cavity Modes", Heriot-Watt University, School of Engineering and Physical Sciences, May 2009, 182 pages.

Notice of Opposition to a European patent dated Dec. 21, 2017 regarding European Patent No. EP2499880, 6 pages.

Notification of the Recording of a Change dated Jul. 13, 2011, regarding International Application No. PCT/IL2010/000381, 1 page.

International Search Report dated Sep. 1, 2010 in International application No., PCT/IL2010/000381, 1 page.

Communication of Notices of Opposition, EPO Form 2318 dated Jan. 16, 2018, regarding European Application No. 10829615.3, 383 pages.

Communication of further notices of opposition, EPO Form 2318 dated Jan. 16, 2018, regarding European Application No. 10829615.3, 540 pages.

Communication of notices of opposition, EPO Form 2317A dated Jan. 16, 2018, regarding European Application No. 10829615.3, 1 page.

Communication of notice of opposition, EPO Form 2316, dated Jan. 5, 2018, regarding European Application No. 10829615.3, 1 page.

Acknowledgement of Receipt dated Dec. 22, 2017 for European Patent No. EP 2499880, 2 pages.

Whirlpool Corporation Opposition Against EP 2 489 880 B1, dated May 12, 2010, 23 pages.

Notice of opposition to a European Patent, EPO Form 2300DE—OPP-0015, dated Dec. 22, 2017, regarding European Patent No. EP 2499880, 7 pages.

Acknowledgement of Receipt—Opposition proceedings in relation to EP 10829615.3, dated Dec. 21, 2017, 2 pages.

Opposition dated Dec. 21, 2017, regarding European Patent No. EP 2499880, 28 pages.

Opposition Annex A2 dated Dec. 21, 2017, regarding European Patent No. EP2499880, 1 page.

Opposition Annex A1 dated Dec. 21, 2017, regarding European Patent No. EP2499880, 1 page.

U.S. Appl. No. 61/282,983, filed May 3, 2010, 86 pages.

U.S. Appl. No. 61/282,981, filed May 3, 2010, 87 pages.

U.S. Appl. No. 61/282,980, filed May 3, 2010, 81 pages.

Certified copy of Priority document for International Application No. PCT/2009/001058, filed Nov. 10, 2009 70 pages.

Summons to Oral Proceedings from the European Patent Office, Ref. P54859EP-K, Application No., 10829615.3-1204, EP Patent. No. 2499880, 14 pages, dated Oct. 18, 2018.

Adams, Microwave Blood Plasma Defroster, Journal of Microwave Power and Electromagn Energy. 26(3):156-9, 1991.

Arens et al., Danger of Overwarming Blood by Microwave, Journal of the American Medical Association, 218: 1045-6, 1971.

Bird, Antenna Feeds, Encyclopedia of RF and Microwave Engineering, pp. 185-217, 2005.

Boström, Rapid Thawing of Fresh-Frozen Plasma with Radio Wave-Based Thawing Technology and Effects on Coagulation Factors During Prolonged Storage at 4°C, Vox Sanguinis 97, 34-38, 2009.

Collin, Foundations for Microwave Engineering, IEEE, 5 pages, 2001.

Collin, Foundations for Microwave Engineering, IEEE, 6 pages, 2001.

Communication Pursuant to Article 94(3) EPC Dated Apr. 29, 2010 From the European Patent Office Re.: Application No. 07706172.9.

Communication Pursuant to Article 94(3) EPC dated Jan. 29, 2013 re European Application No. 09 793 620.7-2214; 4 pages.

Communication Pursuant to Article 94(3) EPC, dated Mar. 26, 2012 Re: European Application No. 09 793 620.7-2214, 5 pages.

(56) References Cited

OTHER PUBLICATIONS

English translation of Notice of Reason for Rejection dated Jul. 2, 2013, from Japanese Patent Office in related Japanese Patent Application No. 2011-535210 (2 pages).
English Translation of Notice of Reason for Rejection, dated Feb. 24, 2012 Re: Japanese Patent Application No. 2008-555943, 5 pages.
English translation of Notice of Reason for Rejection dated Jul. 2, 2014, from Japanese Patent Office in related Japanese Patent Application No. 2011-535210, 2 pages.
Evans, Design of a UHF Applicator for Rrewarming of Cryopreserved Biomaterials, IEEE Trans. Biomedical. Engineering 39:217-225, Mar. 1992.
Evans, Electromagnetic Rewarming: The effect of CPA concentration and radio source frequency on uniformity and efficiency of heating, Cryobiology 40:126-138, Jun. 22, 2005.
Extended European Search Report dated Nov. 27, 2014, in a related European Application No. 10829615.3.
First Office Action dated Feb. 20, 2013 in Chinese Application No. 200980154195.2, 10 pages.
Office Action dated Jan. 23, 2014, from Chinese Patent Office in related Chinese Patent Application No. 201080050439.5 (9 pages).
Foster et al., Biological Effects of Radiofrequency Energy as Related to Health and Safety, Encyclopedia of RF and Microwave Engineering, pp. 511-523, 2005.
Geedipalli et al. "Heat Transfer in a Combination Microwave-Jet Impingement Oven", Food and Bioproducts Processing, 86: 53-63, 2008.
Hambling, Tech Watch: Forecasting Pain, Popular Mechanics, 183(12): 32, Dec. 2006.
Herring et al., OSU Tunes Into Cooking Innovation, www.oregonstate.edu/dept/ncs/newsarch/2004/May04/radiocooking.htm, Mar. 5, 2004.
Hirsch, Indicators of Erythrocyte Damage After Microwave Warming of Packed Red Blood Cells, Clinical Chemistry, 49(5):792-9, 8 pages, May 2003.
Hirsch, Temperature Course and Distribution During Plasma Heating with a Microwave Device, Anaesthesia.58(5):444-7, May 2003.
International Preliminary Report on Patentability and Written Opinion dated Aug. 26, 2008 From the International Preliminary Examining Authority Re.: Application No. PCT/IL2007/000235.
International Preliminary Report on Patentability and Written Opinion dated Aug. 26, 2009 From the International Preliminary Examining Authority Re.: Application No. PCT/IL2008/000231.
International Preliminary Report on Patentability and Written Opinion dated Aug. 26, 2009 From the International Bureau of WIPO Re.: Application No. PCT/IL2007/001073.
International Preliminary Report on Patentability dated Jan. 13, 2009 From the International Bureau of WIPO Re.: Application No. PCT/IL2007/000864.
International Preliminary Report on Patentability dated May 29, 2008 From the International Preliminary Examining Authority Re.: Application No. PCT/IL2007/000236.
International Search Report and the Written Opinion dated Jun. 24, 2010 From the International Searching Authority Re.: Application No. PCT/IL2009/001059.
International Search Report and Written Opinion dated Mar. 3, 2010 From the International Searching Authority Re.: Application No. PCT/IL2009/001057.
International Search Report and Written Opinion dated Sep. 11, 2007 From the International Searching Authority by the Patent Cooperation Treaty Re.: Application No. PCT/IL2007/000235.
International Search Report and Written Opinion dated Nov. 13, 2008 From the International Searching Authority Re.: Application No. PCT/IL2008/000231.
International Search Report and Written Opinion dated Jun. 15, 2010 From the International Searching Authority Re.: Application No. PCT/IL2009/001058.
International Search Report and Written Opinion dated May 20, 2008 From the International Searching Authority by the Patent Cooperation Treaty Re.: Application No. PCT /IL2007/001073.
International Search Report and Written Opinion dated Dec. 27, 2007 From the International Searching Authority by the Patent Cooperation Treaty Re.: Application No. PCT/IL2007/000864.
International Search Report and Written Opinion dated Aug. 31, 2007 From the International Searching Authority by the Patent Cooperation Treaty Re.: Application No. PCT/IL20007/000236.
International Search Report and Writtten Opinion regarding International Application No. PCT/IL10100380, dated Aug. 30, 2010, 12 pages.
International Search Report and Writtten Opinion regarding International Application No. PCT/IL10100381, dated Sep. 1, 2010, 124 pages.
Khummongkol et al. "Heat Transfer Between Impinging Air and Impinged Surface: A Factorial Design", The Joint International Conference on 'Sustainable Energy and Environment (SEE)', Hua Hin, Thailand, Dec. 1-3, 2004, 4-003(O): 431-436, 2004.
Kim, Novel Microstrip-To-Stripline Transitions for Leakages Suppression in Multilayer Microwave Circuits, Department of Electrical Engineering, University of California, Los Angeles, California, 4 pages, 1998.
Kusama et al., A Study on the Door Seal Structure of a Microwave Oven Using the Finite-Difference Time-Domain Method, Microwave and Optical Technology Letters / vol. 19, No. 5, 3 pages, Dec. 5, 1998.
Kusama et al., Analysis of Door Seal Structure of Microwave Oven with Consideration of Higher Modes by the FDTD Method, Electronics and Communications in Japan, Part 2, vol. 85, No. 3, 8 pages, 2002.
Kusama et al., Size Reduction of the Door Seal Structure of a Microwave Oven by the FD_TD Method, Electronics and Communications in Japan, Part 2, vol. 86, No. 10, 2003, 11 pages.
Lapin, N9GL's RF Safety Column: The Military's New RF Weapon, ARRL Handbook for Radio Amateurs, http://www.arrl.org/rfsafety/lapin/2001/03/28/1/index.html. 3 pages—Mar. 28, 2001.
Lee et al., Suppression of the CPW Leakage in Common Millimeter-Wave Flip-Chip Structures, IEEE Microwave and Guided Wave Letters, vol. 8, No. 11, 3 pages, Nov. 11, 1998.
Liang, Multiband Characteristics of Two Fractal Antennas, Microwave and Optical Technologies Letters, vol. 23(4):242-245, Nov. 20, 1999.
Marcroft et al. "Flow Field in a Hot Air Jet Impingement Oven—Part II: Multiple Impingement Jets", Journal of Food Processing Preservation, 23: 235-248, 1999.
Marcroft et al. "Flow Field in a Hot Air Jet Impingement Oven—Part I: A Single Impinging Jet", Journal of Food Processing Preservation, 23: 217-233, 1999.
Matsumoto et al, An Efficient Analysis on Door Structure of a Microwave Oven Using Combined Waves of Higher Order Modes, IEEE Xplore;, 4 pages, Jan. 1, 2003.
Matsumoto et al., An Analysis of a Door Seal Structure of a Microwave Oven with an Inserted Sheet-Type Lossy Material Using FDTD Method, Electronics and Communications in Japan, Part 1, vol. 85, No. 9, 8 pages, 2002.
Mett et al., Microwave Leakage from Field Modulation Slots in TE011 Electron Paramagnetic Resonance Cavities, Review of Scientific Instruments 76, 014702 (2005),11 pages, Dec. 22, 2004.
Notice of Defects issued from the Israeli Patent Office in corresponding Israeli Patent Application No. 193581, dated Sep. 26, 2011, total 2 pgs (including translation).
Notice of Rejection dated Mar. 11, 2014, from Japanese Patent Office in related Japanese Patent Application No. 2012-537480 (2 pages).
Office Action dated Aug. 7, 2014, in related Israeli Application No. 53773.
Official Action dated Nov. 10, 2011 From the US Patent and Trademark Office Re.: U.S. Appl. No. 12/899,348.
Official Action dated Jul. 14, 2010 From the State IP Office, P.R. China Re.: Application No. 200780014028.9.
Official Action dated Nov 22, 2011 From the US Patent and Trademark Office Re.: U.S. Appl. No. 12/907,663.
Official Action dated Jun. 28, 2011 From the US Patent and Trademark Office Re.: U.S. Appl. No. 12/222,948.

(56) References Cited

OTHER PUBLICATIONS

Penfold, Control of Thermal Runaway and Uniformity of Heating in the Electromagnetic Warming of a Cryopreserved Kidney Phantom, Cryobiology 30, 493-508, 1993.
Polk et al., Dielectric Properties of Tissues, Handbook of Biological Effects of Electromagnetic Fields, CRC Press, 2nd Ed., pp. 25-63, 1996.
Pozar, D.M., "Chapter 4: Microwave Network analysis," Microwave Engineering, 2nd ed., John Wiley & Sons, Inc., pp. 190-211, 1998.
Rabinovitch, New Design for the MKI FR Finger Contacts in the LHC, CERN Non-Member National Summer Student 2007, 8 pages.
Repacholi, Radiofrequency Electromagnetic Field Exposure Standards, IEEE Engineering in Medicine and Biology Magazine, 6: 18-21, Mar. 1987.
Response dated Feb. 23, 2010 to the Written Opinion dated Nov. 25, 2009 From the International Searching Authority Re.: Application No. PCT/IL2009/000199.
Risco "Microwaves and Vascular Perfusion: Obtaining Very Rapid Organ Cooling", Cryobiology, 49: 294, Abstract No. 11, 2004.
Robinson, Electromagnetic re-Warming of Cryopreserved Tissues: Effect of Choice of Cryoprotectant and Sample Shape on Uniformity of Heating, Physics in Medicine and Biology,. 47:2311-2325, 2002.
Robinson, Rapid Electromagnetic Warming of Cells and Tissues, IEEE Trans. Biomed. Eng. 46:1413-1425, Dec. 1999.
Rocha et al., Optimization of a Door Seal Structure of a Microwave Oven Using a FDTD Method, International Journal of Numerical Modeling: Electronic Networks, Devices and Fields Int. J. Number. Model. 2008; 21:507-513, 7 pages, Jul. 21, 2008.
Schwan et al., RF-Field Interactions With Biological Systems: Electrical Properties and Biophysical Mechanisms, Proceedings of the IEEE, 68(1): 104-113, Jan. 1980.
Scott, Understanding Microwaves, A Wiley-Interscience Publication, John Wiley and Sons, pp. 326-331, 1993.
Shelley, Inside View on Deep Heat www.eurekamagazine.co.uk/article/9659/Inside-view-on-deep-heat.aspx, 2 pages, May 14, 2007.
Sherman et al., A New Rapid Method for Thawing Fresh Frozen Plasma, Transfusion 1974; 14: 595-7, 1974.
Sohngen et al., Thawing of Fresh—Frozen Plasma with a New Microwave Oven, Transfusion 1988; 28: 576-80, 1988.
Swain et al., What is the Most Energy Efficient Method of Cooking a "British" Roast Dinner, University of Bristol, 3 pages, Feb. 2008.
The Second Office Action dated Nov. 5, 2013, from Chinese Patent Office in related Chinese Patent Application No. 200980154195.2 (7 pages).
Tomiyasu, Minimizing Radiation Leakage from Microwave Ovens, IEEE Microwave Magazine, 3 pages, Feb. 1, 2008.
Umashankar et al., A Novel Method to Analyze Electromagnetic Scattering of Complex Objects, IEEE Transactions on Electromagnetic Compatibility, vol. EMC-24, No. 4, 9 pages, Nov. 1, 1982.
Umishita et al., Absorption and Shielding Effect of Electromagnetic Wave at GHz Frequency by Multi-walled Carbon Nanotube/Polymer Composites, Proceedings of the 9th European Conference on Wireless Technology, 4 pages, Sep. 1, 2006.
Von Hippel, Dielectric Materials and Applications, 5 pages, 1954.
Walker, Fractal Volume Antennas, Electronics Letters, vol. 34(16):1536-1537, Aug. 6, 1998.
Wusterman, Vitrification of Large Tissues with Dielectric Warming: Biological Problems and Some Approaches to Their Solution, Cryobiology 48:179-189, 2004.
Letter from Whirlpool in the European Patent Office, Ref. P54859EP-K, Application No. 10829615.3-1204, EP Patent No. 2499880, 4 pages, dated Apr. 10, 2019.
Letter with Written Submissions from Whirlpool in the European Patent Office, Ref. P54859EP-K, Application No. 10829615.3-1204, EP Patent No. 2499880, 27 pages, dated Mar. 26, 2019.
Letter with Written Submissions from Stefan Haas in the European Patent Office, Ref. P54859EP-K, Application No. 10829615.3-1204, EP Patent No. 249988, 14 pages, dated Mar. 26, 2019.

* cited by examiner

DEVICE AND METHOD FOR HEATING USING RF ENERGY

CROSS-REFERENCE TO RELATED APPLICATIONS

This application is a Continuation of U.S. patent application Ser. No. 13/508,932, the 371(c) date of which is Aug. 23, 2012, (now U.S. Pat. No. 9,462,635), which is a national stage entry of International Application No. PCT/IL2010/000381, filed on May 12, 2010,which claims the benefit of 1) International Application No. PCT/IL2009/001058, entitled "Device and Method for Heating using RF Energy," filed on Nov. 10, 2009; 2) U.S. Provisional Patent Application No. 61/282,981, entitled "Modal Analysis," filed on May 3, 2010; 3) U.S. Provisional Patent Application No. 61/282,983, entitled "Loss Profile Analysis," filed on May 3, 2010; and 4) U.S. Provisional Patent Application No. 61/282,980, entitled "Spatially Controlled Energy Delivery," filed on May 3, 2010. All of these listed applications are fully incorporated herein by reference in their entirety.

The present application is related to four other U.S. Provisional Patent Applications: 1) U.S. Provisional Application No. 61/282,985, entitled "Modal Energy Application," filed on May 3, 2010; 2) U.S. Provisional Application No. 61/282,986, entitled "Degenerate Modal Cavity," filed on May 3, 2010; 3) U.S. Provisional Application No. 61/282,982, entitle "Partitioned Cavity," filed on May 3, 2010; and 4) U.S. Provisional Application No. 61/282,984, entitled "Antenna Placement in an Electromagnetic Energy Transfer System," filed on May 3, 2010. All of these listed applications are fully incorporated herein by reference in their entirety.

FIELD OF THE INVENTION

The present application, in some embodiments thereof, is concerned generally with dissipation of electromagnetic (EM) energy in a load, and specifically with using EM energy for thawing, heating and/or and cooking.

BACKGROUND OF THE INVENTION

The microwave oven is a ubiquitous feature in modern society. However, its limitations are well known. These include, for example, uneven heating and slow absorption of heat, especially for thawing (or defrosting). In fact, ordinary microwave ovens, when used for thawing and even heating, result in foods in which the one part may be generally warm or even partly cooked or overcooked before another part is even defrosted. Thawing and warming of objects using conventional microwave ovens typically suffers from uneven and typically uncontrolled dissipation of energy in the load.

SUMMARY OF THE INVENTION

The present invention, in some embodiments thereof, stems from the inventors' realization that equal dissipation of energy into a load during thawing may result at times in a non-even temperature profile of the load, and possibly in thermal runaway phenomena (in which the temperature in one part of the load increases much faster than in other parts). In particular, thermal runaway can result in a situation where a change in temperature of a warmer portion beyond a certain point causes an increased rate of change in temperature in that portion thereby continuously increasing the temperature gap.

In an exemplary embodiment of the invention, energy dissipation is controlled in one or more of three manners: (a) reducing maximum dissipated energy (e.g., at all or a portion of the transmitted frequencies or MSEs (Modulation Space Elements will be described later in greater detail)); (b) causing more efficient energy dissipation into the load at frequencies or MSEs where the dissipation rate is low as compared to frequencies where dissipation is high; and/or (c) monitoring the load closely enough to avoid overheating between monitoring acts. Optionally, less power is differentially dissipated in particular in portions of the load where thermal runaway is a greater danger, for example, in liquid water portions.

In an exemplary embodiment of the invention, rather than use/measure the dissipation rate, what is measured is a dissipation ratio (e.g., ratio between input and dissipation) or even a normalized dissipation ratio, normalized, for example, to a range of 0 to 1 or normalized to an average dissipation ratio.

In an exemplary embodiment of the invention, the dissipated power v. dissipation ratio graph is quasi-Gaussian, rather than an essentially reverse correlation. At low dissipation ratios it may be desirable to dissipate more power but such dissipation is limited by the poor dissipation ratio, even if the maximal available power setting is used. At the highest dissipation ratio it may be desirable to transmit nothing (or very little). The intermediate levels are affected by both tendencies, hence the quasi Gaussian shape.

In an exemplary embodiment of the invention, it is assumed that each frequency or MSE represents a load portion or portions. A same portion of the load may absorb at multiple frequencies or MSEs. In an exemplary embodiment of the invention, it is assumed that the dissipation at a frequency or MSE is commensurate with the dissipation in those portions.

In an exemplary embodiment of the invention, the maximum applied energy (hpl) is calculated based on spectral information of the load. Optionally or alternatively, the selection of power level per frequency or MSE is selected according to such properties. Optionally or alternatively, selection of power per frequency or MSE is based on a selection of a subset of frequencies or MSEs in which to have more power dissipate into the load. Optionally or alternatively, selection of power per frequency or MSE, for each frequency or MSE, is based on analysis of the spectral information acquired at all frequencies or MSEs of that band, or based on spectral information acquired at all frequencies or MSEs that are considered to be coupled to the load (e.g., without bands that are with a high Q values, e.g. above 0.25%, or 0.5% or 1%).

In an exemplary embodiment of the invention, the spectral information is analyzed to distinguish thawed and unthawed portions. Optionally, such distinction is based on general properties of the spectral information, rather than on a frequency by frequency or MSE by MSE analysis, for example, assuming a bimodal distribution of a spectral dissipation image between ice and water can allow to separate ice and water on a gross basis according to matching to the expected bimodal distribution. At times, the there is an overlap between the two modes, wherein a frequency or MSE dissipates to some extent in both water and ice portions of the load.

In an exemplary embodiment of the invention, the thawing protocol parameters depend on load size and/or volume, for example, correcting for a method of estimating thawed water/ice content which may be skewed by larger absolute ice content of a large target and/or if it's initial temperature is near thawing.

In an exemplary embodiment of the invention, the identification of water content/high dissipation frequencies or MSEs is based on an assumption that ice has a lower dissipation than water. Optionally, a threshold value, relative or absolute, is used to detect such frequencies or MSEs. Optionally, a threshold is provided for relatively pure ice, above which it is assumed the material is a mixture of ice and water. Optionally, the system in general is designed so that non-load portions have a very low dissipation or no energy or very little energy is transmitted in frequencies or MSEs that are expected to dissipate therein. Optionally, a high threshold is provided, above which it is assumed the absorbing material is water and therefore low or no power should be transmitted causing low or no power dissipation into the load. Optionally, intermediate dissipation ratio frequencies or MSEs are tracked based on an assumption that they reflect mixed water ice portions which may all thaw out and/or in which there is an intermediate danger of the water content having a runaway thermal event. Optionally, such intermediate frequencies or MSEs receive intermediate power levels.

In an exemplary embodiment of the invention, large ice sections (with low dissipation in all frequencies or MSEs) are not over compensated for (e.g., not assumed to be water and therefore receive low power), by detecting, based on the spectral information, that there is large ice and providing more energy in those frequencies or MSEs, until indications of small ice sections start appearing in the spectral information. For example, energy transmission in frequencies or MSEs with intermediate dissipation ratios is not reduced to the same extent as that of frequencies or MSEs with high dissipation ratios, in case such frequencies or MSEs represent large ice.

In an exemplary embodiment of the invention, these and/or other parameters, such as thresholds, power/frequency ratios and times depend on load properties and/or desired heating effect. Optionally, a table with various options is stored in memory and a user can select. Optionally or alternatively, a series of functions are provided and applied according to user or automatic selection.

Optionally or alternatively, the maximum power level is calculated using trial and error methods and/or as a function of average dissipation in a load.

In an exemplary embodiment of the invention, the maximum applied power level and/or frequency or MSE dependent power level are updated during thawing or other heating or energy applying process. Optionally, this updating occurs a plurality of times (for example, practically continuously, such as 1000/sec or 2/sec or even once every 5 seconds or more) during the thawing process.

In an exemplary embodiment of the invention, the time between scans and/or dissipation between scans is selected to reduce the danger of overheating and/or thermal runaway. Optionally, the power levels used, thresholds, scanning rate and/or other parameters depend on scenarios to be avoided. In one example, if a small amount of water is mistaken for a large amount of ice (and thus irradiated with high power), the scan settings and/or hpl are selected so that the next scan would detect such an effect (caused by the amount of water growing in a manner that it would not be mistaken for ice.

Optionally, the load and/or cavity are manipulated to improve the spectral information, for example, to assist in distinguishing water from ice. This may allow the calculation of a higher power level for transmission (e.g. average) and/or a higher dissipation ratio (e.g. average or minimal) and thus allow a faster thawing with sufficient quality. For example, the position of the load in the cavity may be changed (e.g. by rotating or agitating a plate on which the load is placed) and the spectral information would be compared between a plurality of positions. Optionally, energy transmission will take place with the load positioned such that the spectral information acquired is most useful for the ice/water distinction (e.g., having the highest calculated hpl).

In an exemplary embodiment of the invention, a minimum low power level is dissipated at frequencies or MSEs where power was previously applied, to prevent cooling and/or refreezing of such thawed portions. Optionally or alternatively, the maximum power allowed to dissipate into the load at a given frequency or MSE between a first and second acquisition of spectral information is such that a thawed portion would not heat up much above thawing before power is stopped based on change in spectral information.

In an exemplary embodiment of the invention, rather than apply exact amounts of power, use is made of frequent feedback. Optionally or alternatively, the method of applying power takes into account properties of the power amplifiers used.

The inventors hypothesize that uneven temperature profiles may be caused or exacerbated by one or more of the possibilities detailed below. However, it should be noted that the methods described herein may also be applied independent of such hypothesis. Furthermore, it is noted that in accordance with some embodiments of the invention, what is avoided is not uneven temperatures per se, but rather overheating or danger of overheating in significant parts of the load (e.g., 0.1%, 0.5%, 1%, 2%, 5%, 10% or intermediate percentages, e.g., depending on application, user desires).

(a) Non-uniform composition. A real-life load normally comprises different materials (e.g. fat, bone, skin and muscle in a chicken portion or air pockets within ground meat or icicles forming between shrimp in a shrimp package) which have different specific heat ($C_p$) and/or different latent heat (L). In such case, equal dissipated energy may result in unequal temperatures (as RF heating is normally faster than heat transfer by conduction within the object). In accordance with some embodiments of the invention this is taken into account (e.g., using a preset table) when determining power levels for load portions associated with such different materials.

(b) Non-uniform thermal state and heat transfer behavior. The load may have different temperatures at different locations (either initially or during thawing). This may be due for example to non-equilibrated cooling before thawing commenced (e.g. the interior being warmer than the exterior, if freezing was incomplete or vice versa, if a frozen object was briefly exposed to a higher temperature than its own) or to exposure of the load's surface to different environments, before or during heating (warm air, internal and external convection currents, cold plate, possibly during heating) or to heterogeneous composition as mentioned above or to an irregular shape of the load (with some portions being thinner than others), or to an irregular shape of the load, e.g., whereby different portions might have a different surface/volume ratios, or a combination of two or more of the aforesaid. This may result in a relatively warm portion(s) passing through phase change long before the cooler portion(s) will have begun the phase change (even if the load is 100% homogeneous and the energy dissipation to all portions thereof is identical). In an exemplary embodiment of the invention, the heating protocol takes such uneven temperatures and/or heat dissipation into account during heating. Optionally, such taking account is automatic by directing most power to ice portions.

(c) Temperature-dependent heating. For many types of material the amount of energy required to engender phase change will cause a significant increase in temperature (e.g. by 20, 40 or even 80° C.) if applied to the matter after phase change. As a result, equal dissipation of energy in frozen material may result in the warmer portion(s) overheating before phase change will have been completed in the cooler portion(s). In an exemplary embodiment of the invention, such overheating is avoided by reducing power to areas that are sensitive to overheating and/or where power/heat ratio indicates faster heating material.

It is noted that the above may apply at times also to heating of a load where there is no thawing, whether there is phase change (e.g. boiling) or not (e.g. raising the temperature of a load and/or maintaining it at a desired level).

It should be noted that references to an "object" (also known as a "load" or "object to be heated") to which electromagnetic energy is applied is not limited to a particular form. An "object" or a "load" may include a liquid, solid, or gas, depending upon the particular process with which the invention is utilized. The object may also include composites or mixtures of matter in differing phases. Thus, by way of a non-limiting example, the term object encompasses such matter as food to be defrosted or cooked; clothes or other wet material to be dried; frozen organs to be thawed; chemicals to be reacted; fuel or other combustible material to be to be combusted; hydrated material to be dehydrated; gases to be expanded; liquids to be heated, boiled or vaporized, or any other material for which there is a desire to apply, even nominally, electromagnetic energy.

In accordance with an exemplary embodiment of the invention, uneven heating, or at least thermal runaway, are avoided, at least to some extent, if significantly more RF energy is dissipated in sections that did not undergo phase change than in sections that have already phase changed. One particular example is dissipating more power in thawed portions than in non-thawed portions, fat and/or other non-frozen materials.

It should be noted that the terms RF or electromagnetic energy, as used herein, includes any or all portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which is a frequency of 3 KHz to 300 GHz, respectively. In some other examples, the frequency bands may be between 500 MHz to 1500 MHz or between 700 MHz to 1200 MHz or between 800 MHz-1 GHz. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum.

In an exemplary embodiment of the invention, such uneven distribution of energy dissipation is achieved by transmitting a high power at frequencies or MSEs having a relatively low dissipation ratio or frequencies or MSEs that dissipate primarily in ice, whilst transmitting a low (or even no) power at frequencies or MSEs that have a relatively high dissipation ratio or frequencies or MSEs that dissipate primarily in water.

In accordance with exemplary embodiments of the invention, it is noted that the dissipation of a given frequency or MSE in different load portions (e.g. water and in ice or load portions having different dissipation ratios for any other reasons, including, for example, polarity, lipid content and water content) depends on many factors, including the load composition, size, shape, location and orientation within the cavity and the exact temperature and phase in different portions of the load. Under different conditions a given frequency or MSE may dissipate mainly in water, mainly in ice or in both. However, the inventors discovered that when obtaining spectral information from the cavity, an analysis of the obtained information may be used to deduce a useful thawing protocol and/or may reflect the pattern of dissipation in water and/or ice that may occur.

In the context of the present application, the term "spectral information" means the interaction data for RF in the chamber at different frequencies or MSEs and/or with the load in the chamber, for example, sweeping the frequency or MSE at a constant or changing power using one or more cavity feeds at a time and measuring the reflected power received by said one or more cavity feeds, optionally taking into account the power actually transmitted into the cavity at each frequency or MSE. At times one feed is transmitting while one or more other feeds (or all other feeds) measure the reflected power. At times, the process is repeated for one or more of the plurality of feeds. A non-limiting example is the obtaining of a spectral image as described in PCT publication WO07/096878.

In an exemplary embodiment of the invention, a restraining function is used for calculating the RF power, to transmit into a cavity such that a smaller amount of energy (or no energy at all) dissipates into the portions that have a relatively high dissipation ratio, while a larger amount of energy will dissipate into the portions that have a relatively low dissipation ratio. In an exemplary embodiment of the invention, the function is selected so that energy dissipated per volume unit (or the dissipation per mass unit) is smaller for portions with a high dissipation ratio, as compared to portions with a low or intermediate dissipation ratio. In an exemplary embodiment of the invention, a restraining function is used for calculating the RF power to transmit into a cavity such that a smaller amount of energy (or no energy at all) will dissipate into the load by frequencies or MSEs that have a relatively high dissipation ratio, while a larger amount of energy will dissipate into the load by frequencies or MSEs that have a relatively low dissipation ratio. In an exemplary embodiment of the invention, the heating automatically and/or inherently adjusts for portions of the load becoming thawed (or partially thawed) (or frequencies or MSEs that increase in dissipation ratio into the load) and thereupon reclassified as "high dissipation portions (or frequencies or MSEs)" (or "intermediate dissipation portions (or frequencies or MSEs)"). For example, by performing a frequency or MSE scan or sweep after a heating session, changes may become apparent in the dissipation ratios of at least some of the used frequencies or MSEs, which changes correlate at least in part with phase changes in respective portions of the load. By recalculating the transmission protocol based on the newly acquired spectral information, the device can self adjust for the progress of thawing (and/or changes in the location of the load if it shifts during operation).

In an exemplary embodiment of the invention, the transmitted energy at each frequency or MSE is selected such that the amount of energy that will dissipate into the load at a frequency or MSE having a high dissipation ratio (e.g. 70% or more or 80% or more) may be 50% or less than the energy that is dissipated into the load at frequencies or MSEs that have a relatively low dissipation ratio (e.g. 40% or less or 30% or less). At times this would be 20% or less, 5% or less, 0.1%, even 0% of the energy dissipated in frequencies or MSEs having a low dissipation ratio.

While the above has focused on thawing, it may be applied to other phase changes or situations where the relationship between power dissipation and heating rate changes abruptly and/or in situations where it is desired to avoid thermal runaway (e.g., when trying to uniformly heat an object containing both low dissipation ratio and high dissipation ratio sections, commensurate with a high and low specific heat, and/or a high and low latent heat, respectively). In addition, multiple (e.g., 3, 4, 5, or more) differently heated portions do not include frequencies or MSEs (or portions) where no energy is transmitted. Optionally, different frequencies or MSEs are assigned to such multiple portions based on their dissipation ratio. However, it is noted that thawing is a point of particular interest due to the large amount of energy required for the phase change as compared to the energy required for temperature change and considering that food is often stored frozen and served or prepared thawed. Similarly, portions which might be damaged by overheating and/or portions which are unacceptable if not heated enough, may be additionally or alternatively of interest. At times, there might be a desire to heat different portions differently for any other reason (e.g. to heat (e.g. cook) one portion but not another or to reach different final temperatures).

It is also noted that while the underlying strategy in some embodiments is to tailor the power per volume unit according to the effect of such power on the targeted load portion, in accordance with some embodiments this is achieved in directly by targeting specific frequencies or MSEs and tailoring power according to the dissipation in those frequencies or MSEs, without directly ensuring a certain power level per unit volume.

There is provided in accordance with an exemplary embodiment of the invention, a method of heating a load in using RF, comprising:

(a) providing a load having an overheating temperature point;

(b) selecting a maximum power to be dissipated in the load in a manner which avoids overheating; and (c) applying RF power to said load at a plurality of different frequencies or MSEs, said power being different at different frequencies or MSE's and below said maximum power at all frequencies or MSEs.

In an exemplary embodiment of the invention, said selecting comprises trading off uniformity of heating with speed of heating. At times, the maximum power selected might be the maximum power available by the device at any given frequency or MSE multiplied by the dissipation ratio at that frequency or MSE. Optionally or alternatively, applying RF power comprises causing a phase change in said load. Optionally, said phase change comprises thawing. Alternatively said phase change comprises evaporation.

In an exemplary embodiment of the invention, said phase change comprises a ratio of at least 1:20 between the effectiveness of power to cause phase change in a load portion unit and the effectiveness of the power to increase the temperature of a load portion unit that has phase-changed by 1 degree Celsius.

In an exemplary embodiment of the invention, said power is selected and applied in a manner which avoids thermal runaway in said load during said applying.

In an exemplary embodiment of the invention, selecting a maximum power comprises selecting a maximum power as a function of an average dissipation of the load.

In an exemplary embodiment of the invention, selecting a maximum power comprises selecting a maximum power as a function of spectral information of the load.

In an exemplary embodiment of the invention, the method comprises selecting a minimum power to apply at frequencies or MSEs where power is applied.

In an exemplary embodiment of the invention, the method comprises selecting a power for each of said plurality of frequencies or MSEs. Optionally, selecting a power comprises selecting one or more sub-bands of frequencies to power, within a wider bandwidth of a system used for applying said RF power.

In an exemplary embodiment of the invention, the method comprises repetitively retrieving spectral information of said load and using said information to guide at least one of said selecting and said applying.

In an exemplary embodiment of the invention, applying said RF power comprises applying power at a frequency with an inverse ratio to a dissipation ratio at said frequency.

In an exemplary embodiment of the invention, the method comprises avoiding applying power at frequencies with a dissipation ratio below a low threshold level.

In an exemplary embodiment of the invention, the method comprises avoiding applying power at frequencies with a dissipation ratio above a high threshold level.

In an exemplary embodiment of the invention, said applying is responsive to identifying ice in said load and wherein said identifying comprises identifying according to frequencies with low dissipation. Optionally, identifying is compensated for the mass of the load. Optionally or alternatively, identifying is according to a threshold which is dependent on the load type.

There is provided in accordance with an exemplary embodiment of the invention, apparatus configured to carryout the selecting and applying of any of the preceding claims.

There is provided in accordance with an exemplary embodiment of the invention, a method of heating a load using RF, comprising:

(a) providing a load having a different dissipation ratios at different portions;

(b) setting frequency/energy pairs such that in heating the load less energy (or power) is transmitted at frequencies that dissipate at a first dissipation ratio than at frequencies that dissipate at a second dissipation ratio, wherein said second dissipation ratio is higher than said first dissipation ratio in a given transmission cycle; and (c) applying said frequency power pairs to heat said load.

There is provided in accordance with an exemplary embodiment of the invention, a method of heating a load using RF, comprising:

(a) providing a load having a different rate of heating per transmitted energy (h/te) applied at different portions;

(b) setting frequency/energy pairs such that in heating the load less energy per unit volume of portions is transmitted at frequencies that correspond to portions with a high h/te rate than at frequencies corresponding to portions with a low h/te; and (c) applying said frequency power pairs to heat said load.

There is provided in accordance with an exemplary embodiment of the invention, a method of heating a load using RF, comprising:

(a) providing a load having different dissipation ratios at different portions;

(b) setting frequency/power pairs such that in heating the load a different power application protocol is applied at frequencies that dissipate at a first dissipation ratio and at frequencies that dissipate at a second dissipation ratio; and (c) applying said frequency/power pairs to heat said load.

In an exemplary embodiment of the invention, said applying comprises applying more power for a portion with a lower dissipation ratio. Optionally or alternatively, a difference between two or more power application protocols comprises a total amount of energy per load amount to be dissipated in their respective load portions. Optionally or alternatively, a difference between two or more power application protocols comprises a tradeoff between heating velocity and homogeneity.

In an exemplary embodiment of the invention, said setting comprises associating frequencies into sets associated with dissipation ratios; and wherein said setting comprises selecting frequency/power pairs according to said sets. Optionally, said setting comprises selecting a power level per set. Optionally or alternatively, said associating comprises associating based on information in addition to said dissipation ratio. Optionally or alternatively, at least one set includes a plurality of non-continuous frequency ranges with at least one frequency belonging to another set between said ranges. Optionally or alternatively, at least one set corresponds to frozen material. Optionally or alternatively, associating comprises associating into at least three sets. Optionally or alternatively, said associating frequencies or MSEs into sets is performed by associating into a preset number of sets. Optionally, said preset number of sets is between 2 and 10 sets.

In an exemplary embodiment of the invention, associating comprises associating into at least two sets each having a significant amount of dissipated energy or power assigned to a plurality of frequencies or MSEs therein, said significant amount being at least 7% of a total dissipated power in a heating cycle being assigned to a set. Optionally or alternatively, at least two of said sets have a non-zero transmitted power and wherein an average dissipated power of one set is at least twice that of another set. Optionally or alternatively, at least two of said sets have a non-zero transmitted power and wherein an average dissipated power of one set is at least five times that of another set. Optionally or alternatively, at least two of said sets have a non-zero transmitted power and wherein an average dissipated power of one set is at least ten times that of another set. Optionally or alternatively, a set or sets for which power is transmitted cover at least 5% of working frequencies or MSEs. Optionally or alternatively, a set or sets for which power is transmitted cover at least 20% of working frequencies or MSEs. Optionally or alternatively, at least two of said sets each correspond to a dissipation ratio range of values of at least 10%.

In an exemplary embodiment of the invention, said load comprises food. Optionally or alternatively, said load comprises a combination of at least two food portions. Optionally or alternatively, said applying causes a phase change in said load. Optionally or alternatively, said applying causes a thawing of at least a part of said load.

In an exemplary embodiment of the invention, the method comprises repeating (b) and (c) at least twice as part of a heating process.

There is also provided in accordance with an exemplary embodiment of the invention, a method of heating a load using RF, comprising:

(a) providing a load having a different rate of heating per power applied (h/p) at different portions;

(b) setting frequency/power pairs such that in heating the load less power per unit volume of portions is transmitted at frequencies that correspond to portions with a high h/p rate than at frequencies corresponding to portions with a low h/p; and (c) applying said frequency power pairs to heat said load.

There is also provided in accordance with an exemplary embodiment of the invention, apparatus configured to carryout the selecting and applying of any of the preceding claims. Optionally, the apparatus comprises a memory having a plurality of power application protocols stored therein and configured to apply different protocols to different sets of frequencies.

There is also provided in accordance with an exemplary embodiment of the invention, a method of heating a load in using RF, comprising:

(a) providing a load having an overheating temperature point;

(b) selecting a maximum power to be dissipated in the load in a manner which avoids overheating; and (c) applying RF power to said load at a plurality of different frequencies, said power being different at different frequencies and below said maximum power at all frequencies. Optionally, applying RF power comprises causing a phase change in said load. Optionally, said phase change comprises thawing. Optionally or alternatively, said phase change comprises evaporation.

In an exemplary embodiment of the invention, said phase change comprises a ratio of at least 1:20 between the effectiveness of power to cause phase change in a load portion unit and the effectiveness of the power to increase the temperature of a load portion unit that has phase-changed by 1 degree Celsius.

In an exemplary embodiment of the invention, said power is selected and applied in a manner which avoids thermal runaway in said load during said applying. Optionally or alternatively, selecting a maximum power comprises selecting a maximum power as a function of an average dissipation of the load. Optionally or alternatively, selecting a maximum power comprises selecting a maximum power as a function of spectral information of the load. Optionally or alternatively, selecting a maximum power comprises selecting a maximum power as a function of the maximal power that may be transmitted by the device into the cavity at any given frequency.

In an exemplary embodiment of the invention, the method comprises selecting a minimum power to apply at frequencies or MSEs where power is applied. Optionally or alternatively, the method comprises selecting a power for each of said plurality of frequencies or MSEs. Optionally, selecting a power comprises selecting one or more sub-bands of frequencies or MSEs to power, within a wider bandwidth of a system used for applying said RF power.

In an exemplary embodiment of the invention, the method comprises retrieving spectral information of said load and using said information to guide at least one of said selecting and said applying. Optionally, said retrieving of spectral information is performed repetitively.

In an exemplary embodiment of the invention, applying said RF power comprises applying power at a frequency or MSE with an inverse relation to a dissipation at said frequency or MSE.

In an exemplary embodiment of the invention, the method comprises avoiding applying power at frequencies or MSEs with a dissipation ratio below a low threshold level.

In an exemplary embodiment of the invention, the method comprises avoiding applying power at frequencies or MSEs with a dissipation ratio above a high threshold level.

In an exemplary embodiment of the invention, said applying is responsive to identifying ice in said load and wherein said identifying comprises identifying according to frequencies or MSEs with low dissipation. Optionally, identifying is compensated for the mass of the load. Optionally or alternatively, identifying is according to a threshold which is dependent on the load type.

In an exemplary embodiment of the invention, said applying comprises normalization of dissipation ratio values.

In an exemplary embodiment of the invention, applying power comprises applying different aggregate amounts of power, for a given time period, such that an actual power for a certain frequency or MSE is fixed, but a duration of application of the power within a time period is varied between frequencies or MSEs, yielding a different effective aggregate power for different frequencies or MSEs.

In an exemplary embodiment of the invention, applying power comprises grouping a plurality of said frequencies or MSEs into a plurality of sets and varying the amount of power applied on the basis of applied power per set.

In the present disclosure, many of the concepts have been described in conjunction with frequencies and/or modulation space elements. In some embodiments, frequency may be included among one or more parameters used to define or manipulate a modulation space element. In general, therefore, concepts relating to the presently disclosed embodiments that are described in terms of frequency may also extend more generally to embodiments that include the use of modulation space elements.

Some exemplary embodiments may include an apparatus for applying EM energy to a load. The apparatus may include at least one processor configured to receive information indicative of dissipated energy for each of a plurality of modulation space elements and group a number of the plurality of modulations space elements into at least two subsets based on the information received indicative of dissipated energy. The processor may also be configured to associate a power delivery protocol with each of the at least two subsets wherein the power delivery protocol differs between subsets and regulate energy applied to the load in accordance with each power delivery protocol.

Other exemplary embodiments may include a method for applying EM energy to a load. The method may include receiving information indicative of dissipated energy for each of a plurality of modulation space elements; grouping a number of the plurality of modulations space elements into at least two subsets based on the information received indicative of dissipated energy; associating a power delivery protocol with each of the at least two subsets wherein the power delivery protocol differs between subsets; and regulating energy applied to the load in accordance with each power delivery protocol.

Another exemplary embodiment may include an apparatus for applying energy to a load having a plurality of subcomponents. The apparatus may include at least one processor configured to determine a value of an energy dissipation characteristic associated with each subcomponent and regulate energy transfer to the material based on the values of the energy dissipation characteristic, such that a subcomponent of a first type is caused to absorb more energy than a subcomponent of a second type. The subcomponents may, for example, be different one from the other in the phase of matter (e.g. frozen and thawed).

Another exemplary embodiment may include an apparatus for applying energy to a material having a first phase of matter and a second phase of matter. The apparatus may include at least one processor configured to regulate application of EM energy to selectively apply energy to a first portion of the material having the first phase of matter and to selectively limit energy applied to a second portion of the material having the second phase of matter.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

DETAILED DESCRIPTION OF EXEMPLARY EMBODIMENTS

Overview

Figure 1:
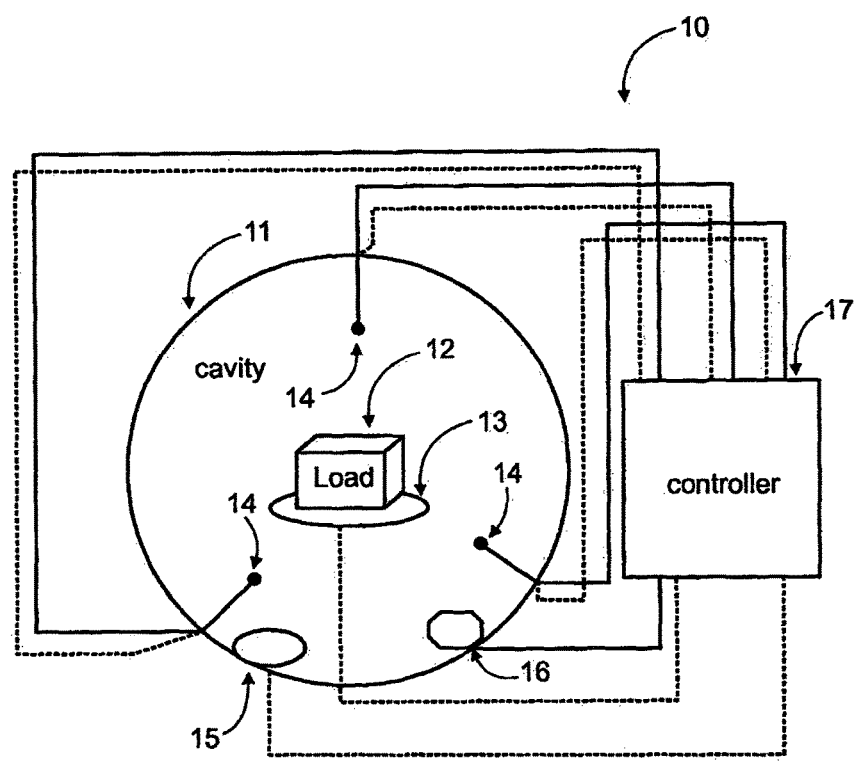
FIG. 1 schematically depicts a device in accordance with an exemplary embodiment of the present invention.

The present application describes, inter alia, a number of advances in the field of RF heating (e.g. microwave or UHF) heating. While, for convenience these advances are described together in the context of various apparatus and methods, each of the advances is generally independent and can be practiced with prior art apparatus or method (as applicable) or with a non-optimal version of the other advances described herein. Furthermore, advances described in the context of one embodiment of the invention can be utilized in other embodiments and should be considered as being incorporated as optional features in the descriptions of other embodiments, to the extent possible. The embodiments are presented in somewhat simplified form to emphasize certain inventive elements. Furthermore, it is noted that some features that are common to some or all embodiments of the invention may be described in the section entitled "Summary of the Invention" and should also be considered as being part of the detailed description of the various embodiments.

A method and device for providing essentially equal dissipation of energy in a general irregular load follows PCT publication WO07/096878 to Ben-Shmuel and Bilchinsky ('878) incorporated herein by reference. In an exemplary embodiment, a device according to '878 uses information that is obtained by transmitting a plurality of RF frequencies (all within a band of frequencies) into a cavity to obtain the full S-parameters of the cavity within that band, thereby being able to determine the spectral information of the cavity (e.g., dissipation of energy into the cavity) as a function of frequency. This information is used to deduce at which power (if any) each of the swept frequencies should be transmitted into the device in order to obtain a desired dissipation pattern within the cavity.

In one option, the power is transmitted only in bands that primarily dissipate in the load (and not surface currents or between antennas). This can be performed for example such that the product of the efficiency η and the power fed is substantially constant for all transmitted frequencies or MSEs, and it allows an essentially equal dissipation (as a function of frequency or MSE) of energy in the load or the cavity, regardless of the load's composition.

During thawing of an object, ice in the object melts to water. Ice and water have different absorption for RF energy, resulting in a different return loss and coupling as a function of frequency. This may change matching, and after re-matching by adjustment of the matching elements, the frequency of the absorption efficiency peak may change. Optionally, by monitoring the frequency that is chosen for input (based on the acquired information) and especially its rate of change, the point at which all of the ice has melted to water can be determined and heating terminated (if only thawing is desired).

More generally, differing materials (or materials having varying characteristics) typically have variable absorptive properties (e.g. due to being composes of a plurality of materials or of a material having different phases). Moreover, absorptive properties are often a function of temperature and/or phase of the materials in the object. Thus, as the temperature and/or phase of an object changes, the object's absorptive properties may change, and the rate and magnitude of this change may depend on properties of material(s) in the object. In addition, the shape of an object may contribute to its absorptive properties at a particular frequency. Irregularly shaped objects, for example, may exhibit irregular electromagnetic energy absorption. All these factors can make it difficult to control the absorption of electromagnetic energy in an object.

Exemplary System

FIG. 1 schematically depicts a device 10 according to an embodiment of the present invention. In an exemplary embodiment of the invention, the device is constructed and operated as described in WO07/096878, with one or more of the changes detailed below. In particular, in an exemplary embodiment of the invention, the controller is configured such that power transmission is avoided to high absorption portions (for example corresponding to thawed portions or more polar portions or portions having a lower fat or higher water or salt content) so that danger of overheating is reduced. Additionally or alternatively, a, for example, significantly lower power is provided to defrosted portions, as power needed for temperature change and thawing in unthawed areas is much higher than needed for heating of fluid parts, so providing a similar power level would cause runaway heating of thawed portions and only mild heading/thawing of unthawed portions.

Device 10, as shown, comprises a cavity 11. Cavity 11 as shown is a cylindrical cavity made of a conductor, for example a metal such as aluminum. However, it should be understood that the general methodology of the invention is not limited to any particular resonator cavity shape. Cavity 11, or any other cavity made of a conductor, operates as a-resonator for electromagnetic waves having frequencies that are above a cutoff frequency (e.g. 500 MHz) which may depend, among other things, on the geometry of the cavity. For example—a broad band of RF frequencies may be used, for example 800-1000 MHz. Methods of determining a cutoff frequency based on geometry are well known in the art, and may be used. A load 12 is placed within the cavity, optionally on a supporting member 13 (e.g. a conventional microwave oven plate). In an exemplary embodiment of the invention, cavity 11 comprises one or more feeds 14 (e.g. antennas or radiating elements) which may be used for transmitting RF energy into the cavity. The energy is transmitted using any method and means known in that art, including, for example, use of a solid state amplifier. One or more, and at times all, of the feeds 14 can also be used one or more times during the heating process for obtaining the spectral information of the cavity within a given band of RF frequencies to determine the spectral information of the cavity (e.g., dissipation of energy into the cavity) as a function of frequency in the working band. This information is collected and processed by controller 17, as will be detailed below.

Controller 17 may include at least one processor configured to execute instructions associated with the presently disclosed embodiments. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

Cavity 11 may include, or, in some cases define, an energy application zone. Such an energy application zone may be any void, location, region, or area where electromagnetic energy may be applied. It may include a hollow, or may be filled or partially filled with liquids, solids, gases, or combinations thereof. By way of example only, an energy application zone may include an interior of an enclosure, interior of a partial enclosure, open space, solid, or partial solid, that allows existence, propagation, and/or resonance of electromagnetic waves. For purposes of this disclosure, all such energy application zones may be referred to as cavities. An object (a/k/a a load) is considered "in" the energy application zone if at least a portion of the object is located in the zone or if some portion of the object receives delivered electromagnetic radiation.

As used herein, the terms radiating element and antenna may broadly refer to any structure from which electromagnetic energy may radiate and/or be received, regardless of whether the structure was originally designed for the purposes of radiating or receiving energy, and regardless of whether the structure serves any additional function. For example, a radiating element or an antenna may include an aperture/slot antenna, or an antenna which includes a plurality of terminals transmitting in unison, either at the same time or at a controlled dynamic phase difference (e.g. a phased array antenna). Consistent with some exemplary embodiments, feeds 14 may include an electromagnetic energy transmitter (referred to herein as "a transmitting antenna") that feeds energy into electromagnetic energy application zone, an electromagnetic energy receiver (referred herein as "a receiving antenna") that receives energy from the zone, or a combination of both a transmitter and a receiver.

Energy supplied to a transmitting antenna may result in energy emitted by the transmitting antenna (referred to herein as "incident energy"). The incident energy may be delivered to the energy application zone, and may be in an amount equal to the energy supplied to the antennas by a source. Of the incident energy, a portion may be dissipated by the object (referred to herein as "dissipated energy"). Another portion may be reflected at the transmitting antenna (referred to herein as "reflected energy"). Reflected energy may include, for example, energy reflected back to the transmitting antenna due to mismatch caused by the object and/or the energy application zone. Reflected energy may also include energy retained by the port of the transmitting antenna (i.e., energy that is emitted by the antenna but does not flow into the zone). The rest of the incident energy, other than the reflected energy and dissipated energy, may be transmitted to one or more receiving antennas other than the transmitting antenna (referred to herein as "transmitted energy."). Therefore, the incident energy ("I") supplied to the transmitting antenna may include all of the dissipated energy ("D"), reflected energy ("R"), and transmitted energy ("T"), the relationship of which may be represented mathematically as $I=D+R+\Sigma T_i$.

In accordance with certain aspects of the invention, the one or more transmitting antennas may deliver electromagnetic energy into the energy application zone. Energy delivered by a transmitting antenna into the zone (referred to herein as "delivered energy" or "d") may be the incident energy emitted by the antenna minus the reflected energy at the same antenna. That is, the delivered energy may be the net energy that flows from the transmitting antenna to the zone, i.e., d=I−D. Alternatively, the delivered energy may also be represented as the sum of dissipated energy and transmitted energy, i.e., d=R+T.

In an exemplary embodiment of the invention, cavity 11 may also include one or more sensors 15. These sensors may provide additional information to controller 17, including, for example, temperature (e.g., by one or more IR sensors, optic fibers or electrical sensors), humidity, weight, etc. Another option is use of one or more internal sensors embedded in or attached to the load (e.g. an optic fiber or a TTT as disclosed in WO07/096878).

Alternatively or additionally, cavity 11 may comprise one or more field adjusting elements (FAE) 16. An FAE is any element within the cavity that may affect its spectral information or the spectral information derivable there from. Accordingly, an FAE 16 may be for example, any object within cavity 11, including one or more of metal components within the cavity, feed 14, supporting member 13 and even load 12. The position, orientation, shape and/or temperature of FAE 16 are optionally controlled by controller 17. In some embodiments of the invention, controller 17 is configured to perform several consecutive sweeps. Each sweep is performed with a different FAE property (e.g., changing the position or orientation of one or more FAE) such that a different spectral information may be deduced. Controller 17 may then select the FAE property based on the obtained spectral information. Such sweeps may be performed before transmitting RF energy into the cavity, and the sweep may be performed several times during the operation of device 10 in order to adjust the transmitted powers and frequencies (and at times also the FAE property) to changes that occur in the cavity during operation.

In an exemplary embodiment of the invention, the FAEs are controlled and/or load rotated or moved, so that a most useful spectral information is acquired for selective irradiation and/or for setting of radiation parameters such as hpl, for example as described below. Optionally or alternatively, the load and/or FAEs are periodically manipulated and/or based on a quality or other property of acquired spectral information. Optionally, the setting are selected which allow a highest hpl to be selected.

An exemplary transfer of information to the controller is depicted by dotted lines. Plain lines depict the control exerted by controller 17 (e.g., the power and frequencies to be transmitted by an feed 14 and/or dictating the property of FAE 16). The information/control may be transmitted by any means known in the art, including wired and wireless communication.

Exemplary Thawing

Figure 2:
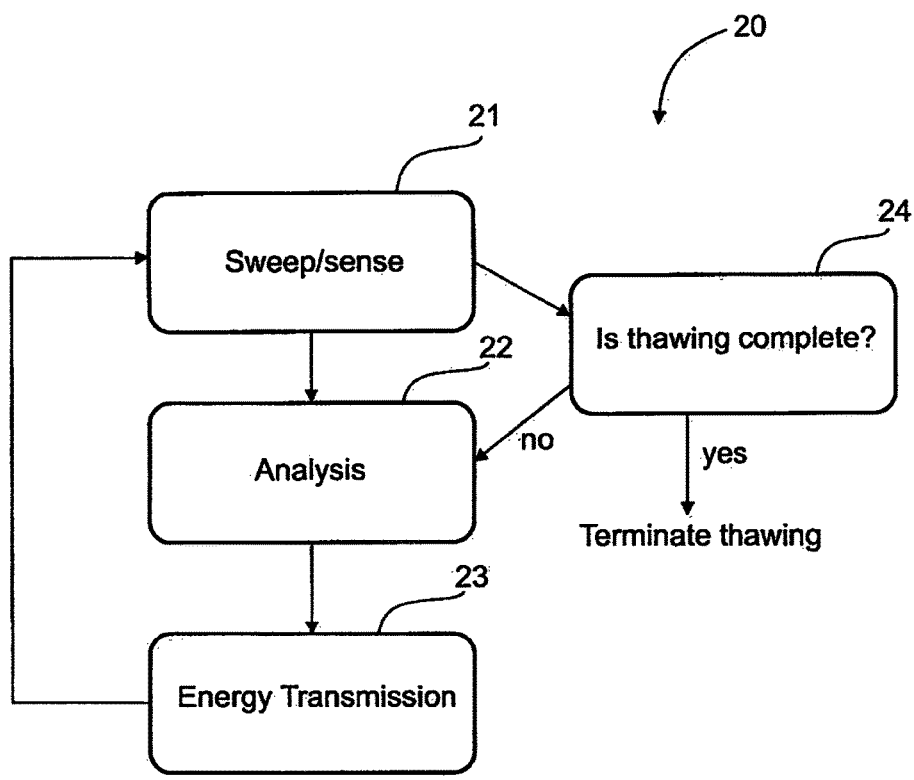
FIG. 2 is a simplified flow chart of a method of operation of a thawing device in accordance with an embodiment of the invention.

Attention is drawn to FIG. 2, which depicts a flowchart 20 showing how the device 10 may be operated to thaw a frozen load (e.g. food) according to an exemplary embodiment of the invention.

After load 12 is placed in cavity 11, a sweep 21 is performed. Sweep 21 may comprise one or more sweeps, allowing the obtaining of an average of several sweeps, thereby obtaining a more exact result. Additionally or alternatively, sweep 21 may be repeated with different FAE properties or different load/plate positions (optionally the sweep is performed several times at each configuration) and/or using different antennas for transmitting/sensing.

In order to improve the accuracy of the analysis of the sweep results, in an exemplary embodiment, the amount of power that is actually transmitted (e.g. if the power transmitted at different frequencies is not identical) at each frequency is included in the calculation, in order to deduce the percent of transmitted energy that is dissipated in the cavity. Such differences in power transmission between frequencies may, for example, be an inherent feature of the device and/or a device component, such as the amplifier.

Once one or more sweep results are obtained, an analysis 22 is performed. In analysis 22 a thawing algorithm is used to define the transmission frequencies and the amount of energy to be transmitted at each frequency based on the spectral information that was obtained at sweep 21 (optionally in conjunction with other input methods, such as a machine readable tag, sensor readings and/or the user interface). Consequently, energy 23 is transmitted into the cavity, optionally as dictated by analysis 22. Optionally, the desired dissipated power is below the expected power which is below the maximum power multiplied by the dissipation ratio.

In an exemplary embodiment of the invention, the load is scanned 120 times in a minute. Higher (e.g. 200/min, 300/min) or lower (e.g., 100/min, 20/min, 2/min, 10/thawing time, 3/thawing time) rates may be used, as well as uneven sampling rates. At times, a scan sequence (e.g., one or more scans) may be performed once every 0.5 seconds or once every 5 seconds or at any other rate, such as higher, lower or intermediate. Moreover, the period between scans may be defined by the amount of energy to be transmitted into the cavity and/or the amount of energy to be dissipated into the load. For example, after a given amount of energy (e.g. 10 kJ or less or 1 kJ or less or several hundreds of joules or even 100 J or less were transmitted or dissipated into the load or into a given portion of a load (e.g. by weight such as 100 g or by percentage, such as 50% of load)), a new scan is performed. In some cases, the information is provided using other means, such as an RF/bar-code readable tag (e.g., with previous scanning information or thawing presets) or using temperature sensors.

In an exemplary embodiment of the invention, the rate of sweeping depends on the rate of change in spectral information between sweeps, for example, a threshold of change in dissipation and/or frequencies (e.g., a 10% change in sum integral) may be provided or different change rates associated with different sweep rates, for example using a table. In another example, what is determined is the rate of change between sweeps (e.g., if the average change between sweeps was less than the change between the last two sweeps). Such changes may be used to adjust the period between scans once or more than once during heating. Optionally or alternatively, changes in the system (e.g. movement of the plate) may affect the sweep rate (typically major changes increase the rate and minor or no changes decrease it).

This process is optionally repeated for a predetermined period of time or until termination by a user. Alternatively, the thawing process may be terminated automatically 24. At 24, which may be performed after each sweep, before each energy transmission and/or at any other stage of the process, sweep results and/or a sensor reading are used to decide whether or not thawing may be or should be stopped. For example—if a phase change completion is detected or if the object's temperature is measured to be above a given temperature (e.g. outer temperature 5° C. or more), thawing may be terminated. In another example, if the total energy dissipated into the load reaches a predetermined amount of energy that is needed for thawing to a desired final temperature (e.g. taking into account the load's initial temperature and composition). Thawing may be stopped. A modification of the flowchart may be used for any other heating process, including for example heating (with or without temperature elevation) and drying. In such cases, the termination point may be defined also by other parameters, including a measured temperature, a desired total amount of dissipated energy in the load, the level of humidity, rate of temperature change, etc.

The (frequency/energy) or (frequency/power) pairs for thawing are optionally selected to increase (or even maximize) energy dissipation in frequencies that have low dissipation ratios in the load (e.g. predominantly solid or ice portions) and reduce (or even minimize) energy dissipation at frequencies that have a relatively high dissipation ratio (e.g. predominantly thawed portion, such as liquid or water). For example, in low dissipation ratios, the device will be set to produce efficient power dissipation (e.g., as a factor of the possible maximal dissipation possible) while at the high dissipation ratios, the device will be set to dissipate much less energy than may be dissipated. At times, such as when the time for transmitting each frequency is fixed, the (frequency/energy) pairs may be (frequency/actual power) pairs. As used herein, power is not necessarily a direct function of time, but may be an indirect function of time. For example, if, within a given time period, such as a minute a fixed power is used, but the duration of application of power is changed (e.g., from 1 to 2 seconds), then the net result is a difference in energy applied per the certain time unit, which is power. Thus, frequency/power pairs can include frequency/energy pairs with an application protocol. It should also be noted that once a protocol is decided for a set of dr values, this may be implemented by providing frequency/power settings, which can vary over time for a same frequency. Further, as described below, a frequency/power pair may be associated directly with a set of frequencies, with the actual assignment of power to a frequency decided as part of the application protocol.

An exemplary thawing algorithm transmits zero power (or energy) at frequencies with dissipation ratio above a predetermined threshold (e.g. 70% dissipation or 70% normalized dissipation, as explained below)) of the maximum dissipation ratio in the selected working frequency range $[f_1, f_2]$ and non-zero powers at other frequencies of that range. In some cases, the powers are selected in a binary fashion—either maximal or minimal. In some cases, the different amounts of power (relative to other frequencies, or absolute) are transmitted by allowing a different transmission time for different frequencies in a cycle. Alternatively, intermediate power levels (or energy amounts) are provided, for example for portions with intermediate dissipation levels.

In an exemplary embodiment of the invention, when power is provided to a frequency or frequency set this power level is selected to be significant. For example, such significance can be measured as a function of the total power provided in a scanning/transmission cycle (e.g., 5%, 10%, 20% or smaller or larger or intermediate values). Optionally or alternatively, this significance can be measured as an effect on temperature of a portion of at least 5% of the load in a cycle, for example, being at least 0.1° C., 0.2° C., 0.5° C. or smaller or intermediate or higher temperature changes. Optionally or alternatively, significance can be measured based on the amount of phase change caused by the power dissipated, for example, being enough to change a spectral image (RMSE) by at least 1%, 3%, 5%, 10% or smaller or intermediate or larger amounts in a cycle or over a period of time such as 30 seconds.

In an exemplary embodiment of the invention, the device includes a memory having stored thereon a plurality of threshold values, hpl values, dissipation/power ratios, dissipation/energy ratios and/or parameters for various load properties. Optionally, the device and/or the user select between such stored options as an initial setting or as a final setting for thawing. For example, a fixed hpl of 80% (of the maximal power of the amplifier at each frequency) may be used for frozen bovine meat of a certain weight.

Exemplary Thawing Algorithm

An exemplary thawing algorithm is the following. In a selected working range $[f_1, f_2]$, high and low boundary powers (hpl, lpl) are selected and any applied power is maintained between these boundaries.

The boundary low power level (lpl) is the minimum power level where dissipation in the load is high enough to be useful. For example, if 15% is selected to be the minimal useful dissipation, lpl will be set for each frequency to be 15% of the maximal power that may be transmitted. Alternatively it may be set at a pre-selected low power for all frequencies (e.g., 60 Watts or less) or any combination of the aforementioned; if the dissipation in the load at a given frequency is below lpl, the transmitted power at that frequency will be set at zero.

The boundary high power level (hpl), determines the highest allowed dissipated power. This means that the highest power outputted is constrained to avoid undesired thermal effects. In addition, the actual power outputted at a given frequency may be selected according to spectral information, in particular, to selectively target unthawed areas. Optionally, the power levels are generally inversely related to dissipation. As may be noted, reducing maximum oven power will generally lengthen thawing times. In some cases, the power levels applied meet a binary criterion: hpl for low dissipating portions and some other value (such as zero) for high dissipating areas.

Using an excessively high hpl may cause an unacceptable uneven temperature distribution in the load and may result in thermal runaways. The more sensitive a load is to transmitted power (e.g., at a certain working band), the lower would be the power of an acceptable hpl. Optionally, the working band is selected according to which working band better distinguishes water from ice.

Generally, for sensitive loads, a low hpl is set, but such hpl may be used also for less sensitive loads, albeit at the cost of increasing the thawing time. Nonetheless, at times it may be preferred to set for each load the highest hpl that would provide an acceptable post thaw temperature distribution in the load (e.g. ±15° C., ±10° C., ±5° C., ±2° C. or even more uniform). The acceptable post thaw temperature distribution can depend, for example, on one or more of the composition of the load, its sensitivity to overheating (e.g. whether damage is caused; its extent and reversibility; and to what extent the damage is material) and the purpose for which the load is intended. It is noted that at times, speed of thawing is preferred over quality, in which case a higher hpl may be used, and the post thaw quality would be suboptimal. Optionally, the device is provided with a user selectable tradeoff (e.g., knob or data input) between uniformity, maximum temperature and/or rate of thawing.

It is noted that in accordance with some embodiments of the invention, prevention of hot spots is actively preferred over uniformity of thawing, heating and/or energy dissipation.

Optionally, hpl is set low enough so that a thawed section will not be over heated before heating at its respective frequencies is stopped or reduced.

Exemplary Methods of Determining Hpl (High Power Level)

hpl may be determined in various manners, for example, by trial and error. In an exemplary embodiment of the invention, several hpl settings are tried to determine the maximal hpl which would provide an acceptable temperature distribution in the load, post thawing. Such trials may continue during thawing, for example, being performed every scan, every second or every minute or at intermediate time scales. In an exemplary embodiment of the invention, hpl is started at low values and increased gradually. Optionally, the hpl is set per item type.

In an exemplary embodiment of the invention, preset hpl values are provided for various combinations of load properties, such as ore or two or more of shape, weight, temperature, desired effect and/or material type. Optionally, a user can select such properties and the device will suggest and/or use an hpl accordingly.

Optionally, hpl is updated periodically during thawing.

In an exemplary embodiment of the invention, hpl is estimated (initially or in an ongoing manner) with the assistance of changing the load and/or cavity so that more useful spectral information is acquired. In general, if the acquired spectral information is better, a better cut-off between ice and water may be identified, allowing a higher hpl to be used for the ice sections and allowing a faster heating at a same quality (e.g., evenness) and/or a higher quality heating at same speed.

Alternatively, and while not wishing to be bound by theory, it is proposed that the sensitivity of the load may be determined based on the relative dissipation of energy in thawed and frozen portions of the load. When the dissipation in frozen portion and thawed portion is relatively similar (e.g. 10-15% dissipation difference, such as between 40% and 50% dissipation ratio) (e.g. due to low water content), the sample is deemed to be of high sensitivity (e.g., the distinction between ice and water requires a more sensitive determination). The greater the disparity is between dissipations in thawed and frozen parts, the lower the sensitivity of the load. Therefore, hpl may be determined by obtaining the spectral information of the load and comparing the maximal dissipation ($d_{max}$) with the minimal dissipation ($d_{min}$) in a working frequency band. The greater the difference is between $d_{min}$ and $d_{max}$ the lesser the sensitivity of the load, and higher the hpl that should optionally be used.

It is noted that the hpl may be allowed to be higher if a better selection of power to intermediate dissipation frequencies is provided.

Also alternatively, and while not wishing to be bound by theory, it is proposed that hpl may be determined based on the maximum power that can be dissipated in the load at each frequency (ep(f)) and ldl. hpl may be set to be such that the portion of the frequencies being used, for example all frequencies within a working band (e.g. the band spanning 800-1000 MHz)) (or other set of frequencies) that are considered to dissipate into the load and for which lpl<ep (f)<hpl would be less than a preset threshold. For example, this threshold may be selected to be 10% or 20% or 30% or any value in-between. Optionally, this method is based on a realization (and/or for cases that) that the device is typically limited in maximum power and that practically, the closer the hpl is to the maximum power, the less easy it may be to provide different power levels at different, near, frequencies. Optionally, the percentage depends on a desired tradeoff between quality and and/or speed.

Accordingly, a thawing protocol may use a single hpl value (e.g. if dedicated to loads having similar sensitivity; or a low hpl that would be suitable for most contemplated loads). Alternatively, the protocol may use a selection between several possible hpl values (e.g. a selection between a number of preset values or optionally setting the value manually or automatically to correspond to a given load and/or acceptable post thaw temperature distribution). Finally, the protocol may use any value (e.g. calculated automatically or selected manually) within the power capabilities of the device. An example of a relatively high hpl may be 300 Watt or 80% of the maximal power from the amplifier at that frequency. An example of a relatively low hpl may be 120 Watts or 30% of the maximal power from the amplifier at that frequency. Interim values are possible as well.

Exemplary Determination of Dissipation Function Dr(f)

dr(f) denotes the dissipation ratio as a function of frequency, namely the percentage of transmitted power through each feed (e.g. feed j) that is dissipated in the load. This function has potential values between 0 and 1, and is optionally computed as shown in Equation 1, based on the measured power and using measured spectral information. However, as noted herein, a binary function or non-linear and/or non-monotonic function may be used (e.g., and determined in a factory or during calibration).

$$dr_j(f) = \frac{P^j_{incident,watt}(f) - \sum_i P^j_{returned,watt}(f)}{P^j_{incident,watt}(f)} = 1 - \frac{\sum_i P^j_{returned,watt}(f)}{P^j_{incident,watt}(f)} \quad \text{(eq. 1)}$$

Normalization of Dr(f)

The dissipation ratio in frozen portions (e.g. ice) is relatively lower than that of the thawed portions (e.g. liquid/water), but a large amount of ice can show considerable dissipation. In order to distinguish dissipation in at frequencies having a low dissipation ratio (e.g. ice) from dissipation at frequencies having a high dissipation ratio (e.g. liquid water), while reducing the effect of relative mass, the dr(f) function is optionally normalized to the whole range between 0 and 1; This normalization may be useful also in other cases where the difference between dissipation in frozen portions and thawed portions is relatively small, regardless of the cause (e.g., low water content). The normalized function—dr'(f)—may be used to calculate the compensation factors, as shown below.

$$drh = \min\{dr(f)\}_{f \in [f_1, f_2]}$$

$$drl = \max\{dr(f)\}_{f \in [f_1, f_2]}$$

$$dr'(f) = (dr(f) - drl)/(drh - drl) \quad \text{(eq. 2)}$$

In case of some loads the use of dr'(f) is optionally avoided, and in original dr(f) used instead. Optionally, a device is configured to have both protocols for alternative use. The choice between the protocols may be based on user input (e.g. user interface or machine readable tags) or on a sensor reading within the device (e.g. a weight sensor). Alternatively, dr'(f) may be used for all loads.

The maximum power that can be dissipated in the load at each frequency (depicted as ep(f)) is optionally calculated as follows, given that $P_{maximum\ j,\ watt}$ is a maximum power available from the amplifier at each frequency.

$$ep_j(f) = dr_j(f) P_{maximum,j,watt}(f) \quad \text{(eq. 3)}$$

Using the above, the compensation function (coeff(f)) is optionally calculated. This function is optionally used to determine the relative amount of energy that should dissipate in the load at each frequency, as a function of dr'(f), for example as shown in eq. 4A:

$$coeff(f) = F(dr'(f)) \quad \text{(eq. 4)}$$

$$F(dr(f)') = \begin{cases} dr' < 3 & 0 \\ dr' > 0.8 & 1 \\ \text{Else} & -2dr' + 1.6 \end{cases} \quad \text{(eq. 4A)}$$

In an exemplary embodiment of the invention, frequencies may be classified as "ice", "water" and/or "mixed ice/water" according to their dissipation ratio. Optionally, higher power is provided into ice and mixed ice/water and plain water is provided with low or no power.

Optionally, there is provided a dissipation threshold below which the dissipation into the load is so low that no power is transmitted, as the load portion is assumed to not be ice. In an exemplary embodiment of the invention, the device is designed to have a very low intrinsic dissipation at any frequencies or a known dissipation at only some frequencies (where the threshold may then be raised).

It is noted that large pieces of ice may have a relatively high dissipation. Optionally, if there are no (or few, e.g., below a threshold) low-dissipation frequencies and it is known that the load is frozen, then it is assumed that the lowest dissipation frequencies are ice and power (at regular or somewhat reduced levels) is provided at such frequencies, until lower dissipation frequencies appear, indicating the formation of smaller frozen regions.

Example dr(f)

Figure 3:
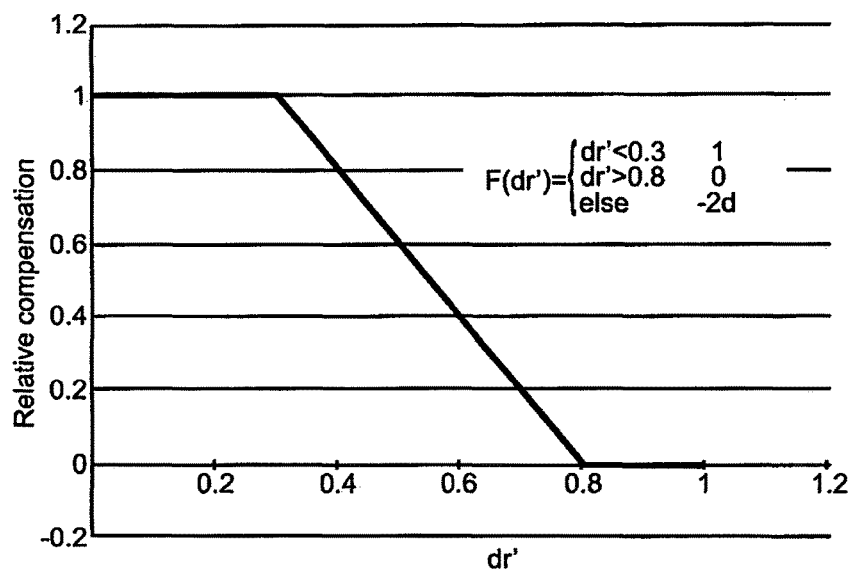
FIG. 3 is a graph of relative compensation vs. normalized dissipation ratio for an exemplary decision function.

An example for a function according to Equation (4) is depicted in FIG. 3. As can be seen, two limits are set. At frequencies that dissipate into the load less than a pre-set threshold (e.g. dr'(f)<0.3 in the example of FIG. 3) the maximal allowed power which is a minimum between the ep(f)/dr(f) and hpl(f)/dr(f) will be transmitted. At frequencies that will dissipate into the load more than a pre-set value (e.g. dr'(f)>0.8 in the example of FIG. 3) no energy will be transmitted. At all other frequencies (0.3<dr'(f)>0.8 in the example of FIG. 3) the power transmission will be calculated using the selected function. In the case of FIG. 3 this was a generally linear function, but other functions, optionally non-linear, may be used that provide an inverse correlation between dr'(f) and coeff(f) (e.g. exponential, step function, piecewise linear, polynomial and/or general look-up table, optionally with interpolation). Optionally, the function prefers applying power to low-dissipation areas to an extent greater than a simple inverse function. Optionally, the function is selected based on a perceived risk of damage to the load.

Exemplary Actual Power Calculation gl(f) is the power to be dissipated in the object to be heated, taking into consideration the maximum power that can be dissipated in the load at each frequency (ep(f)) and hpl(f) and the compensation function (coeff(f)), as follows:

$$gl(f) = \begin{cases} hpl < ep(f) & hpl \cdot coeff(f) \\ lpl < ep(f) < hpl & ep(f) \cdot coeff(f) \\ \text{else} & 0 \end{cases} \quad \text{(eq. 5)}$$

Using gl(f) the power to be transmitted from the amplifier (nopw(f)) in order to cause the desired dissipation in the load, at each frequency, is optionally calculated as follows:

$$nopw(f) = gl(f)/dr(f) \quad \text{(eq. 6)}$$

nopw(f) will always be lower than $P_{maximum,j,watt(f)}$, which is the maximum power extractable from an amplifier at each frequency for the following reason:

$$gl(f) = \begin{cases} hpl < ep(f) & hpl \cdot coeff(f) \\ lpl < ep(f) < hpl & ep(f) \cdot coeff(f) \\ \text{else} & 0 \end{cases} \quad \text{(eq. 7)}$$

$$\max\{gl(f)\} = ep(f)coeff(f) = dr(f)P_{maximum,j,watt}coeff(f)$$

$$\max\{nopw(f)\} = \max\{gl(f)\}/dr(f) = P_{maximum,j,watt}coeff(f)$$

Calculation of Hpl Using Average Dissipation

Figure 5:
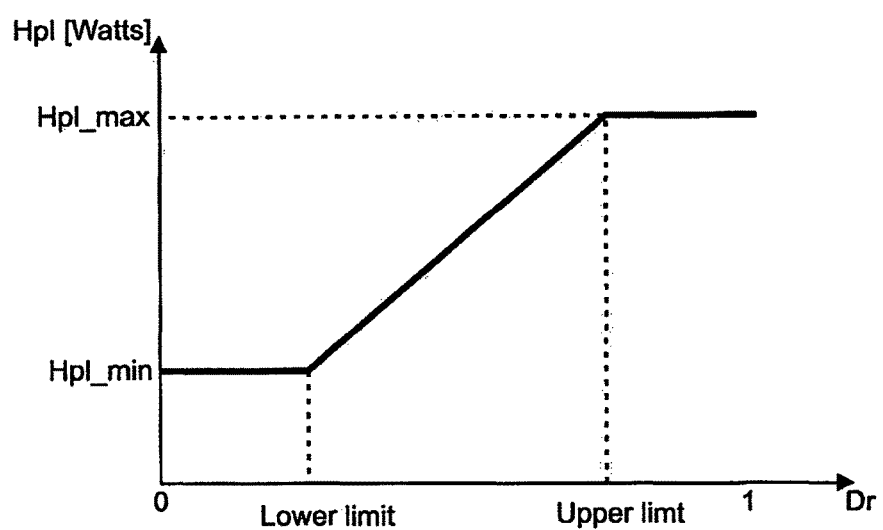
FIG. 5 is a chart illustrating a method of selecting an hpl parameter value as a function of average dissipation.

FIG. 5 shows hpl being calculated as a function of the average dissipation ratio within the working band or within the selected frequencies. Optionally, this is based on the assumption that a low average dissipation means a high sensitivity and vice versa. Other functions may be used as well, for example, a table matching hpl to average dissipation.

As seen in the graph, a low average dissipation ratio indicates a high sensitivity of the load and accordingly dictates a low hpl. The low value of hpl is optionally selected to be slightly above lpl (to provide a minimal working range). For example, the minimal hpl value may be between 70 and 120 Watts (e.g. 80 Watts). The maximal level of hpl may be chosen to be as high as the maximal possible amplifier power or slightly below that. As seen in FIG. 5, when the average dissipation ratio is below a preset lower limit, hpl is selected to be the lowest hpl allowed, and when the average dissipation ratio is above a preset upper limit, hpl is selected to be the highest hpl allowed. The lower limit for average dissipation ratio may be, for example, between 0.1 and 0.3 (e.g. 0.2) while the upper limit may be for example between 0.5 and 0.9 (e.g. 0.6).

In-between values of average dissipation optionally dictate an intermediate hpl value. It is to be appreciated that while FIG. 5 depicts a generally linear correlation for the intermediate average dissipation ratio values, other functions, optionally non-linear, may be used that provide a positive correlation between the average dissipation ratio and hpl (e.g. exponential, step function, polynomial, stepwise linear).

In some cases, the frequency distribution is in frequency bands, so that one band can be recognized as matching ice (e.g., low dissipation) and another matches water (e.g., high dissipation). Optionally, instead or in addition to calculating hpl, gl(f) is set to be zero or at lpl (or any other preset low value) for bands associated with water and at any preset high value (e.g. hpl or a maximum available power or other setting) for ice-associated bands. Optionally, the classification of bands as water/ice is updated optionally periodically based on spectral information that is periodically acquired.

While particular ways of calculating hpl and gl(f) are described above, the methods can be combined, for example, arithmetically or logically, for example, using an average value of several methods or using a minimum or maximum or multiple methods. For example—a Gaussian function of dr(f) (or of dr'(f)) may be used to calculate gl(f).

Exemplary Operation

Figure 4:
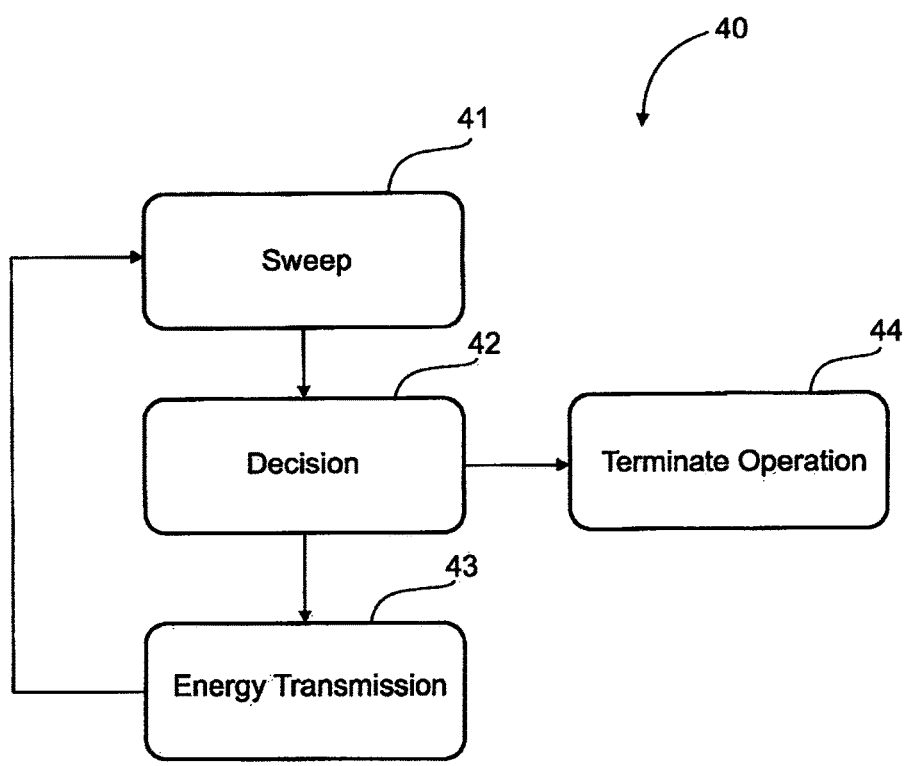
FIG. 4 is a is a simplified flow chart of a method of operation of a device in accordance with another embodiment of the invention.

Attention is now drawn to FIG. 4, which depicts a flowchart 40 showing how the device 10 may be operated according to an exemplary embodiment of the invention.

Sweep 41 is essentially the same as sweep 21 in FIG. 2. Once one or more sweep results are obtained, decision 42 is performed. At decision 42 a decision is made; namely a selection is made between two or more energy transmission protocols and (optionally) termination of the operation sequence. This decision may comprise one or more of the following decisions:

Thawing Protocol—when thawing mode is operated, decision 42 optionally comprises a selection of frequency/power or frequency/energy pairs that are expected to dissipate more energy into ice than into water (e.g. as described above). In an exemplary embodiment of the invention, thawing is detected by tracking one or more of the rate of changes in the spectral image (e.g., changes are faster as phases change); the temperature change rate (e.g., temperatures change faster as phases change) and/or the temperature (e.g. with a sensor).

Heating Protocol A—when this mode is operated, decision 42 optionally comprises a selection of frequency/power or frequency/energy pairs by a different energy pattern by one group of frequencies characterized by a given absolute or relative dr (or dr') value range than by at least one other group. In an exemplary embodiment of the invention, high power or a larger amount of energy per heating cycle is dissipated by one group of frequencies (e.g. those having a relatively high dr or dr' than those having a lower dr or dr'), while in both groups a non-zero amount of power and energy is dissipated.

Heating Protocol B—in an exemplary embodiment, decision 42 comprises a selection of frequency/power pairs that are expected to dissipate more energy into the load than elsewhere (e.g. surface currents, antenna matching, etc.). Non limiting examples for such protocols are disclosed in PCT publications WO07/096878 and WO08/007368.

Keep Warm Protocol—in an exemplary embodiment, decision 42 comprises a selection of frequency/power or frequency/energy pairs that are expected to dissipate an essentially equal amount of energy in all portions of the load in a cycle. Optionally, this heating is controlled such that the temperature of the object will not deviate significantly from a preset temperature (e.g. 35° C.±2° C. or 45° C.±2° C.). For example, this may be done using feedback from a temperature sensor or by limiting the energy allowed to dissipate at any given time. It should be noted that heating water may cause the water to boil away, thereby utilizing dissipated power for evaporation, while other portions may not have evaporation, causing heating.

Protocol Selection—in an exemplary embodiment the protocol is capable of automatically changing operation modes (e.g., terminate thawing once phase change is complete and/or begin heating at that time or select a thawing decision formula). This may depend on input from a sensor and/or from information obtained in a frequency sweep, and/or be based on instructions (e.g. the amount of energy to dissipate in the load at a given step). The decision might be to terminate operation or to change from one protocol (e.g. thawing) to another (e.g. warming).

An example for a sensor input includes the sensing of temperature. Once the temperature sensed by one or more of the sensors (or a calculated temperature, for example, an average) or the temperature at all sensors has reached a predefined temperature, the device may decide to change the heating protocol. For example, if the sensed temperature indicates that thawing is completed, the device may change the protocol to either stop heating or to begin cooking or to maintenance of the sensed temperature (e.g., to ensure full thawing and/or prevent recrystallization if a portion of the load is still frozen or to maintain a load at a serving-ready temperature).

At times, the predetermined temperature that indicates completion of thawing is slightly above the freezing point (e.g. 2-15° C.). When the sensed temperature is an external temperature of the load (e.g. by use of an IR sensor), the predetermined temperature may be at times be selected to be slightly higher than when using internal sensors (e.g. 8-10° C.), since at times, the inner temperature at the end of thawing is lower than the outer temperature (especially if the device provides a warm interior). In another alternative, if the device interior is cool, the inner temperature may be expected to exceed that of the exterior, in which case the sensor reading to indicate the termination of thawing may de lower (e.g. 4-8° C.). At times (e.g., when a plurality of internal sensors is used) a smaller temperature range might be preferred (e.g. 4° C.-6° C.).

Decision 42 may also be based on some form of user input that may be provided before or during operation. The input may be provided through one or more of a user interface, and using a machine readable tag, such as a barcode or RFID. The user input may comprise information regarding a sequence of decisions and/or the triggers thereto, such as one or more of the amount of energy to dissipate, a phase change, a temperature change and/or a temperature change rate.

Once decision 42 is concluded, an energy transmission step 43 at the selected frequency/power or frequency/energy pairs may be transmitted. Optionally, the decision was to terminate operation, in which case the device would transmit no energy to the load, and may send notice (e.g., by playing a sound, light or any form of communication) to a user. At such time the device may terminate operation automatically. This may be accompanied by notification to the user (e.g., by light, sound or message display, or by transmitting an electronic message to a remote device for example a cell phone or computer).

Energy transmission 43 may continue for a period of time (predefined or based on a sensor feedback) and terminate automatically. Optionally or alternatively, transmission 43 is followed by a repeated sweep 41, which allows adjusting the device's operation to changes that occurred during heating (e.g. phase change or new spectral information). Optionally or alternatively, operation of the device at each stage may be manually terminated by a user.

Additional Exemplary Operation

As noted above, a material may include two or more portions (e.g., 3 or more) which it may be desirable to heat by different amounts of energy per unit mass (or volume) and/or at different uniformity/efficiency ratios and/or in which different dissipation ratios are observed. Optionally or alternatively, it is possible that most or all of these portions are not frozen materials or materials that change phase during heating. For example, a portion of relatively high-fat material may be heated together with a portion of a relatively low fat material and/or a portion of relatively high-water material, or a mixture thereof.

In an exemplary embodiment of the invention, when power is applied to an object, parts of the object are classified according to their dissipation ratio and this drives the power (or energy) application protocol used for each such classified portion. It should be noted that portions may be physically separate or intermingled. In an exemplary embodiment of the invention, when power is applied to a load, the transmitted frequencies are classified according to their dissipation ratio in the load and this drives the power (or energy) application protocol used for each such classified group of frequencies. It should be noted that at times, at least two different groups of frequencies are transmitted differently, such that a significant amount of energy is dissipated by all frequencies of said at least two groups.

Figure 8:
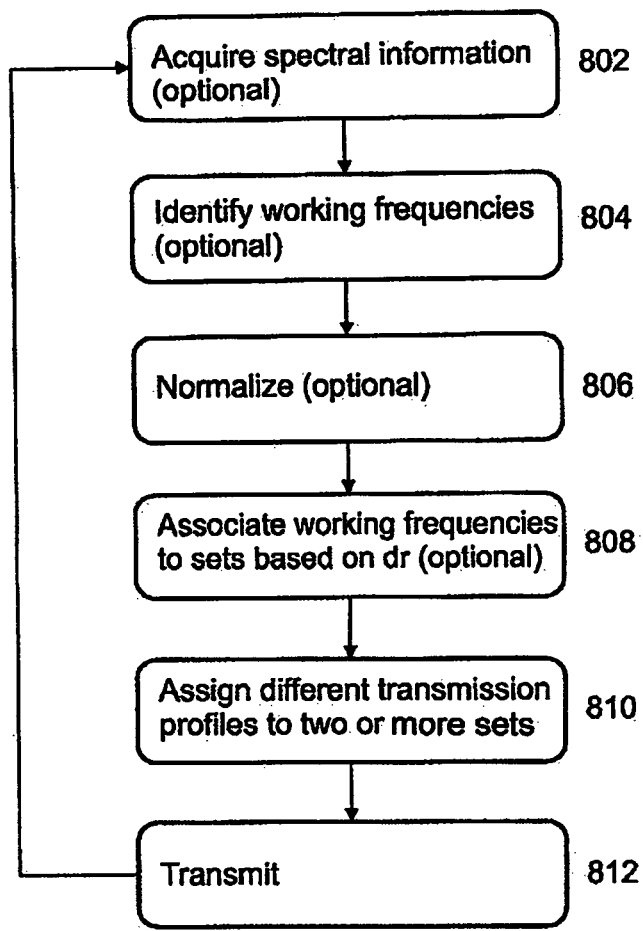
FIG. 8 is a flowchart of a method of differentially heating materials with different dissipation ratios, in accordance with an exemplary embodiment of the invention.

FIG. 8 is a flowchart of a method of differentially heating materials with frequencies having different dissipation ratios in the load, in accordance with an exemplary embodiment of the invention.

At 802, spectral information is optionally acquired. Optionally or alternatively, electro-magnetic properties of portions of an object to be heated may be input, for example, manually, using a camera or using an information-bearing tag associated with the object. Alternatively, for example for some protocols such as thawing, frequencies of water and ice may be provided ahead of time.

At 804, various "working" frequencies are optionally identified with respect to them being useful for the intended heating. Optionally or alternatively, it is determined which frequencies to use with the system, for example, based on amplifier abilities and/or other considerations, such as not operating at a high Q factor, or at excessively low dissipation ratios (e.g. 10% or less).

At 806, the dissipation ratio values are optionally normalized, for example, so that the maximal observed dissipation is given a 100% value and the minimal observed dissipation ratio is given a 0% value. Normalization is optionally linear, for example as explained in the thawing example above.

At 808, working frequencies are grouped according to their dissipation ratio (dr), or normalized dissipation ratio (dr') and/or heating rate. Optionally, the frequencies are clustered according to thresholds. Optionally, such thresholds are provided as noted above regarding information input. Optionally or alternatively, the frequencies are clustered according to their dissipation ratios. Optionally, the dissipation ratio distribution is used to identify an object and/or provide an indication of its composition and/or material phase. Optionally, additional inputs are used, such as a camera or a weight scale and/or humidity/temperature sensor and/or information provided manually or by a machined readable tag (e.g. RFID). For example, there may be 2, 3, 4, 5 or more different dissipation ratio sets identified for associating frequencies therewith. Optionally, the power at one set is at least a factor of 2, 3, 4, 7, 10, 20 or smaller or intermediate factors of a second set with non-zero transmission. In an exemplary embodiment of the invention, at least one set, or optionally all sets have a bandwidth of at least 5%, 10%, 20% or smaller or intermediate bandwidth percentages of the total working bandwidth. In an exemplary embodiment of the invention, at least one set and optionally all sets correspond to dissipation ratios of a span of at least 5%, 10%, 20% or smaller or intermediate spans of dissipation ratio values, for example, a set corresponding to a range of between 45% and 55% dissipation ratios.

In some cases there is an overlap between ranges of dissipation ratios associated with different portion types or locations. At times, a given frequency or group of frequencies dissipates both in a high dissipation ratio portion(s) of a load and a low dissipation ratio portion(s) of a load, such that the frequency displays an intermediate overall dissipation ratio. In some embodiments, frequencies within such overlaps are simply not used. Optionally or alternatively, such frequencies are assigned a separate category. It should be noted that in some embodiments of the invention it is of interest to increase the amount of power (or heating) delivered to a particular portion and/or to reduce the number of frequencies used, while possibly reducing homogeneity. This need not interfere with the main goal of differently applying power or heat to different portions. This can also affect the protocols applied to different sets. For example, a protocol may be defined with respect to the amount of power provided for a set and this power level may be distributed among more or fewer frequencies, based, for example, on ease of frequency changing, reliability of the identification of the frequency in question with a particular portion. Optionally or alternatively, a single set of frequencies of a single portion may be divided up into multiple sets (and/or combined with another set) for the purpose of assigning different protocols thereto. This may be useful for providing desired homogeneity levels and/or heating velocities. Optionally or alternatively, two sets may be combined. Optionally, sets and association of frequencies thereto may change during heating. Optionally, a heating protocol of an object includes points in time to reconsider the association of frequencies into sets.

In some embodiments, the number of groups to which the sets of frequencies is fixed in advance, for example 2-10 groups or 2-4 groups of frequencies, wherein each group is used to transmit energy to the load at a different heating protocol.

At 810, different power application protocols are associated with each set. A power application protocols can include, for example, one or more of: maximum power, minimum power, power relative to other sets or to other frequencies within a set, maximum heating rate, minimum heating rate, relative heating rate (e.g., between sets or between frequencies within sets), power per set, power per each frequency within a set, power to be dissipated in the load by a given set or frequencies within a set, time profile of power application, time duration of power application, method of non-maximal power achievement (e.g., amplification factor, duration at each frequency, number of repetitions in a set and/or combination thereof), heating homogeneity vs. velocity tradeoffs, time profile of pauses between power applications and/or cycling of power application between frequencies. A device may include a memory having stored therein multiple such protocols. It should be noted that the protocols may be markedly different, for example, one portion of the food may be thawed, while another portion is cooked or baked.

In one example, there is little or no power (or energy) transmission at higher dissipation ratios and optionally homogeneous transmission at lower dissipation ratios. Optionally, for intermediate dissipation ratios, there is a discrete decreasing function (optionally a step function at 30% or 50 dissipation ratio), for example, as described above for a thawing application.

In another example, one food portion (e.g., food which is less sensitive to overheating) is heated fast, with maximum power, possibly resulting in more in-homogeneity, while another food portion with other dissipation characteristics is heated slower and/or to a lower temperature, and optionally more uniformly.

At 812, the power application protocol is applied. The process may then be repeated. In some embodiments, acquiring spectral information and/or assigning profiles need not be applied at every transmission sweep and/or at same frequency. The rate of sweep between heating sessions may be fixed or it may change during heating, for example as described above in connection with an exemplary thawing process.

It should be noted that while the above description refers to associating frequencies into sets, this need not be actually done. Rather, setting thresholds for different power application protocols inherently describes such sets and allows the decision of power application protocol to be applied on a frequency by frequency basis. It should also be noted that in some cases, the determination of how much power to apply and in what protocol is directed at sets rather than individual frequencies, with a decision regarding frequency/power pairs being decided after allocation of power to sets is carried out.

As noted herein, when a power is associated with a frequency, this need not mean that the power at which energy is transmitted at the frequency must change. Rather, the power is an aggregate power and can be affected, for example, by a longer transmission time. Optionally, the actual transmitted power is selected according to an ability of the amplifier of the system, for example, according to a high efficiency point of the amplifier or according to a time it takes to change amplification. It is possible that actual power will depend on the maximum power at any frequency. Optionally or alternatively, a selection of frequencies to use is made depending on the available amplification, with frequencies with low amplifications optionally avoided.

Returning to several of the concepts introduced above, it should be noted that, in certain embodiments, at least one processor may be configured to receive or determine information indicative of dissipated energy for each of a plurality of modulation space elements. This may occur using one or more lookup tables, by pre-programming the processor or memory associated with the processor, and/or by testing an object in an energy application zone to determine its absorbable energy characteristics. One exemplary way to conduct such a test is through a sweep.

Figure 11:
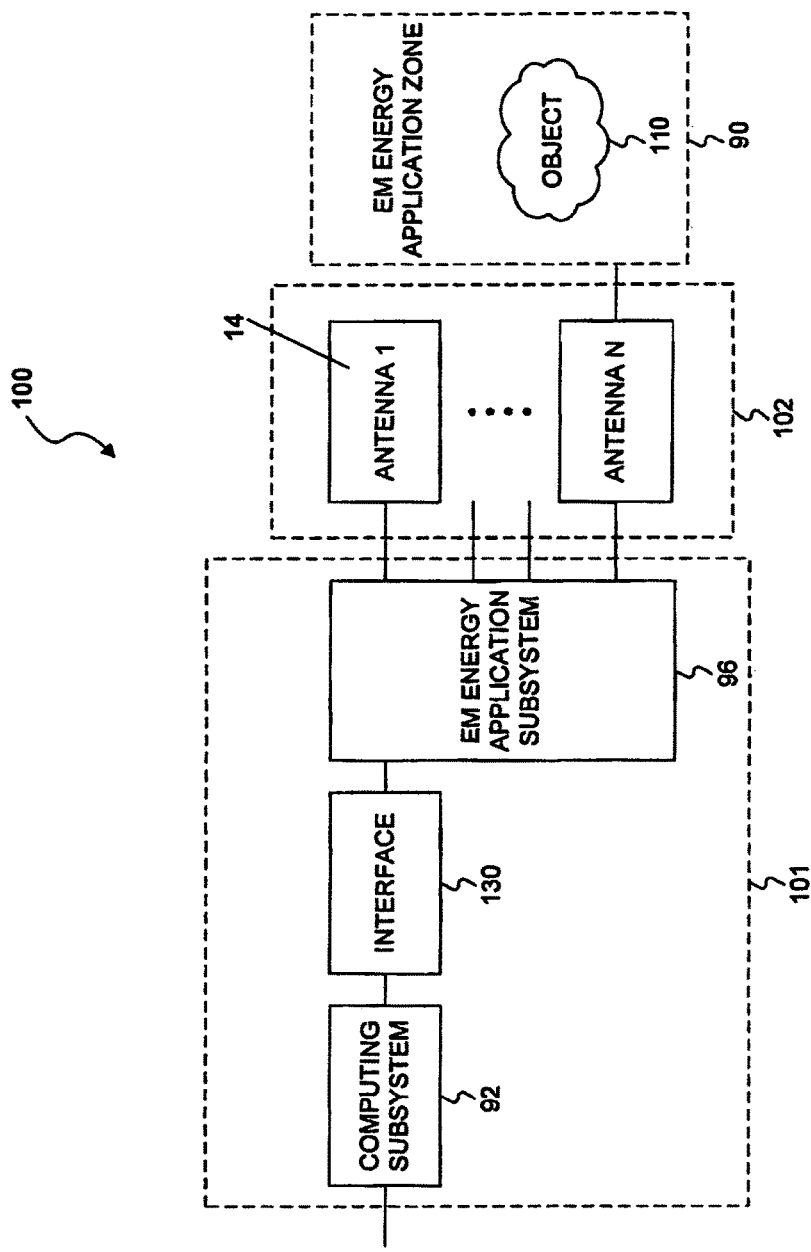
FIG. 11 is a diagram of an apparatus for applying electromagnetic energy to an object, in accordance with an exemplary embodiment of the present invention.

As used herein, the word "sweep" may include, for example, the transmission over time of more than one frequency. For example, a sweep may include the sequential transmission of multiple frequencies in a contiguous frequency band; the sequential transmission of multiple frequencies in more than one non-contiguous frequency band; the sequential transmission of individual non-contiguous frequencies; and/or the transmission of synthesized pulses having a desired frequency/power spectral content (i.e. a synthesized pulse in time). Thus, during a frequency sweeping process, the at least one processor may regulate the energy supplied to the at least one antenna to sequentially deliver electromagnetic energy at various frequencies to an energy application zone 90, and to receive feedback which serves as an indicator of the energy absorbable by object or load 110, as shown in FIG. 11. While the invention is not limited to any particular measure of feedback indicative of energy absorption in the object, various exemplary indicative values are discussed below.

During the sweeping process, electromagnetic energy application subsystem 96 may be regulated to receive electromagnetic energy reflected and/or coupled at antenna(s) 102 (including feeds or antennas 14, for example), and to communicate the measured energy information back to subsystem 92 via interface 130, as illustrated in FIG. 11. Subsystem 92, which may include one or more processors, may then determine a value indicative of energy absorbable by object 110 at each of a plurality of frequencies based on the received information. Consistent with the presently disclosed embodiments, and by way of example only, a value indicative of the absorbable energy may be a dissipation ratio (referred to herein as "DR") associated with each of a plurality of frequencies. As referred herein, a "dissipation ratio," also known as "absorption efficiency" or "power efficiency", may be defined as a ratio between electromagnetic energy absorbed by object 110 and electromagnetic energy supplied into electromagnetic energy application zone 90. A value indicative of the absorbable energy could be any measure or indicator corresponding either directly, indirectly or even inversely or generally inversely to absorbable energy. For example, the value could be a measure or indicator of energy reflected by the object or energy reflected from an energy application zone in which the object is located. Alternatively, the value may be a measure of energy lost when energy is applied to an object or to an energy application zone in which the object is located. Further, the value may be any other indicator from which absorbable energy may be derived. These concepts are further described in succeeding paragraphs.

Energy that may be dissipated or absorbed by an object is referred to herein as "absorbable energy." Absorbable energy may be an indicator of the object's capacity to absorb energy or the ability of the apparatus to cause energy to dissipate in a given object. In the presently disclosed embodiments, absorbable energy may be calculated as a product of the maximum incident energy supplied to the at least one antenna and the dissipation ratio. Reflected energy (i.e., the energy not absorbed or transmitted) may, for example, be a value indicative of energy absorbed by the object or other load. By way of another example, a processor might calculate or estimate absorbable energy based on the portion of the incident energy that is reflected and the portion that is transmitted. That estimate or calculation may serve as a value indicative of absorbed energy.

During a frequency sweep (or sweep of MSEs as will be described later), for example, the at least one processor may be configured to control a source of electromagnetic energy such that energy is sequentially supplied to an object at a series of frequencies or MSEs. The at least one processor may then receive a signal indicative of energy reflected at each frequency or MSE, and optionally also a signal indicative of the energy transmitted to other antennas. Using a known amount of incident energy supplied to the antenna and a known amount of energy reflected and/or transmitted (i.e., thereby indicating an amount absorbed at each frequency or MSE) an absorbable energy indicator may be calculated or estimated. Or, the processor may simply rely on an indicator of reflection as a value indicative of absorbable energy.

Absorbable energy may also include energy that may be dissipated by the structures of the energy application zone in which the object is located. Because absorption in metallic or conducting material (e.g. the cavity walls or elements within the cavity) is characterized by a large quality factor (also known as a "Q factor"), such frequencies or MSEs may be identified as being coupled to conducting material, and at times, a choice may be made not to transmit energy in such sub bands. In that case, the amount of electromagnetic energy absorbed in the cavity walls may be substantially small, and thus, the amount of electromagnetic energy absorbed in the object may be substantially equal to the amount of absorbable energy.

In the presently disclosed embodiments, a dissipation ratio may be calculated using the formula:

$$DR=(P_{in}-P_{rf}-P_{cp})/P_{in}$$

where $P_{in}$ represents the electromagnetic energy supplied into zone 90 by antennas 102, $P_{rf}$ represents the electromagnetic energy reflected/returned at those antennas that function as transmitters, and $P_{cp}$ represents the electromagnetic energy coupled at those antennas that function as receivers. DR may be a value between 0 and 1, and, in the presently disclosed embodiments, may be represented by a percentage number.

For example, in a three antenna system including antennas 1, 2, and 3, subsystem 92 may be configured to determine input reflection coefficients S11, S22, and S33 and the transfer coefficients S12=S21, S13=S31, S23=S32 based on the measured power information during the sweep. Accordingly, the dissipation ratio DR corresponding to antenna 1 may be determined based on these coefficients, according to the formula:

$$DR=1-(|S_{11}|^2+|S_{12}|^2+|S_{13}|^2).$$

Figure 12:
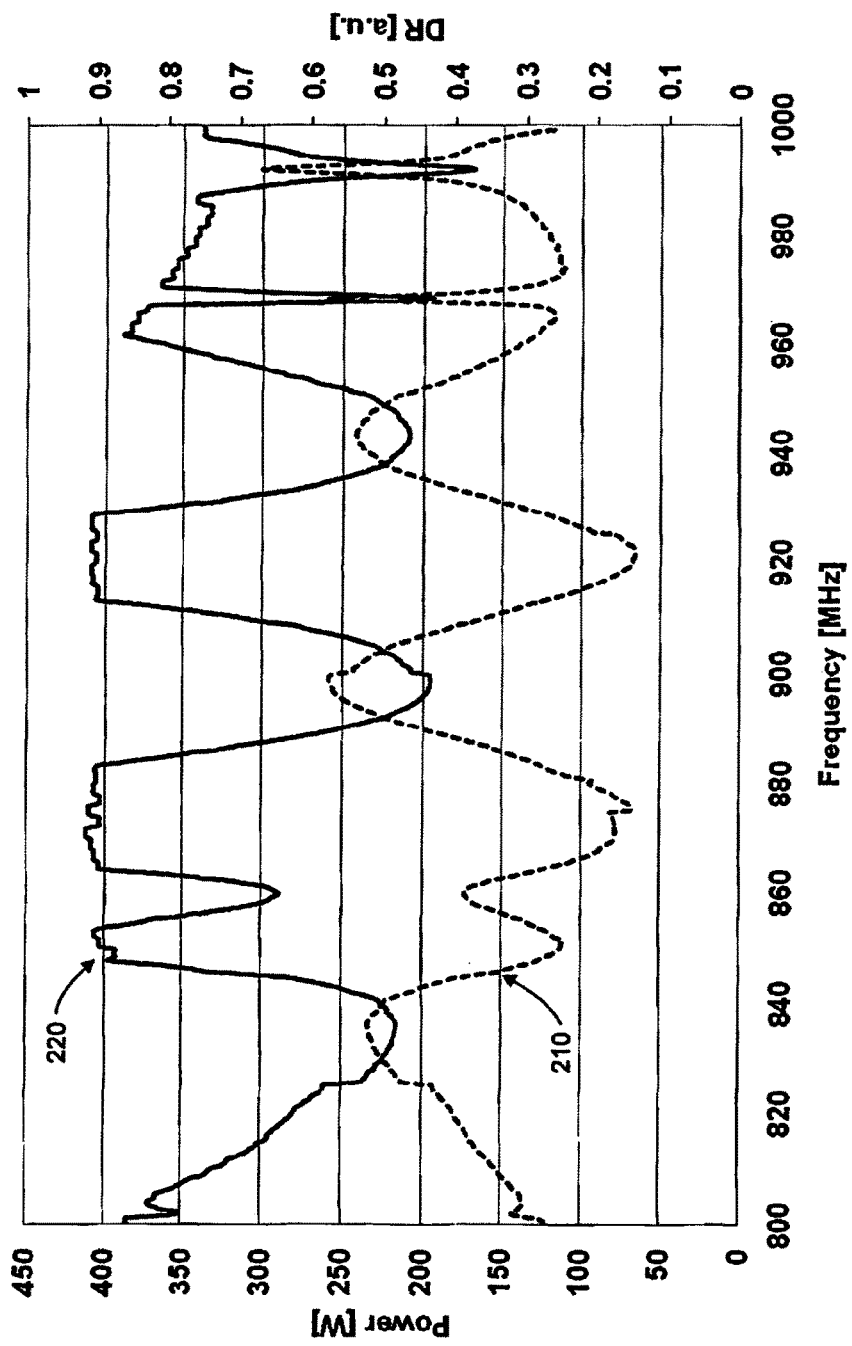
FIG. 12 illustrates a dissipation ratio spectrum (dashed line) and an input energy spectrum (solid line), in accordance with an embodiment of the invention.
Figure 13:
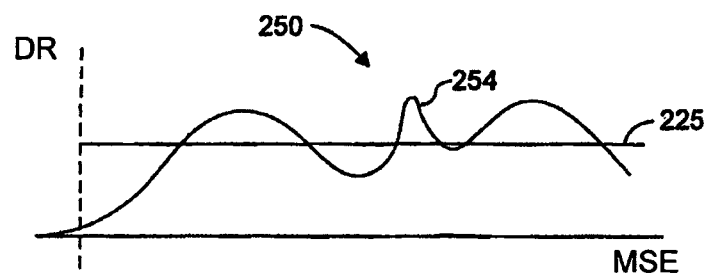
FIG. 13 illustrate a dissipation ratio spectrum, in accordance with an embodiment of the invention.

For a particular object 110, the dissipation ratio may change as a function of the frequency or MSE of the supplied electromagnetic energy. Accordingly, a dissipation ratio spectrum may be generated by plotting the dissipation ratio associated with each frequency or MSE against the respective frequencies or MSEs. Exemplary dissipation ratio (efficiency) spectrums 210 and 250 are illustrated in FIG. 12 and FIG. 13, respectively. FIG. 12 depicts frequencies and FIG. 13 depicts MSEs corresponding to both high and low dissipation ratios. Both illustrate dissipation ratio peaks that are broader than others.

FIG. 13 illustrates a dissipation ratio spectrum 250 over a range of modulation space elements (MSEs). The spectrum 250 plots dissipation ratios (DR) for a particular range of MSEs. Spectrum 250 may include certain areas, such as local peak 254, which are higher than the surrounding areas. Local peak 254 may indicate that a higher percentage of power is dissipated at the corresponding MSE or range of MSEs. Curve 225 may represent a desired level of energy dissipation over a plurality of MSEs. Based on the information included in dissipation ratio spectrum 250, the power at which energy is applied and/or the time duration for which energy is applied at various MSEs may be determined to substantially achieve the desired energy dissipation level 225.

Returning to FIG. 12, curve 210 represents a spectrum of dissipation ratio values over a range of frequencies. Using this information, a desired power level can be provided at each of a plurality of frequencies within this range to achieve a desired energy application profile. Curve 220 represents the power level applied over the frequency band. It can be seen that the power level is substantially inversely proportional to the dissipation ratio curve 210. In the example shown in FIG. 12, 400 W represents the maximum power available to transmit.

According to another exemplary embodiment, the at least one processor may be configured to regulate subsystem 96 (FIG. 11) for measuring a first amount of incident energy at a transmitting antenna at a first frequency or MSE; measure a second amount of energy reflected at the transmitting antenna as a result of the first amount of incident energy; measure a third amount of energy transmitted to a receiving antenna as a result of the first amount of incident energy; and determine the dissipation ratio based on the first amount, the second amount, and the third amount. By way of example, the at least one processor may be configured to measure a first amount of incident energy at a first antenna 102 which performs as a transmitter at a first frequency or MSE, measure a second amount of energy reflected at first antenna 102 as a result of the first amount of incident energy, measure a third amount of energy transmitted to at least one second antenna 102 which performs as a receiver as a result of the first amount of incident energy, and determine the dissipation ratio based on the first amount, the second amount, and the third amount.

The value indicative of the absorbable energy may further involve the maximum incident energy associated with a power amplifier associated with subsystem 96 at the given frequency or MSE. As referred herein, a "maximum incident energy" may be defined as the maximal power that may be provided to the antenna at a given frequency or absorbable energy may be the product of the maximum incident energy and the dissipation ratio. These are just two examples of values that may be indicative of absorbable energy which could be used alone or together as part of control schemes implemented using the processor. Alternative indicia of absorbable energy may be used, depending on the structure employed and the application.

In certain embodiments, the processor may also be configured to cause energy to be supplied to the at least one radiating element in at least a subset of the plurality of frequencies or MSEs, wherein energy transmitted to the zone at each of the subset of frequencies or MSEs may be a function of the absorbable energy value at each frequency or MSE. For example, the energy supplied to the at least one antenna 102 at each of the subset of frequencies or MSEs may be determined as a function of the absorbable energy value at each frequency or MSE (e.g., as a function of a dissipation ratio, maximum incident energy, a combination of the dissipation ratio and the maximum incident energy, or some other indicator). In some of the presently disclosed embodiments, this may occur as the result of absorbable energy feedback obtained during a frequency sweep or MSE sweep. That is, using this absorbable energy information, the at least one processor may adjust energy supplied at each frequency or MSE such that the energy at a particular frequency or MSE may in some way be a function of an indicator of absorbable energy at that frequency or MSE. The functional correlation may vary depending upon application. For some applications where absorbable energy is relatively high, there may be a desire to have the at least one processor implement a function that causes a relatively low supply of energy at each of the emitted frequencies or MSEs. This may be desirable, for example when a more uniform energy distribution profile is desired across object 110.

For other applications, there may be a desire to have the processor implement a function that causes a relatively high supply of energy. This may be desirable to target specific areas of an object with higher absorbable energy profiles. For yet other applications, it may be desirable to customize the amount of energy supplied to a known or suspected energy absorption profile of the object 110. In still other applications, a dynamic algorithm or a look up table can be applied to vary the energy applied as a function of at least absorbable energy and perhaps one or more other variables or characteristics. These are but a few examples of how energy transmitted into the zone at each of the subset of frequencies or MSEs may be a function of the absorbable energy value at each frequency or MSE. The invention is not limited to any particular scheme, but rather may encompass any technique for controlling the energy supplied by taking into account an indicator of absorbable energy.

In certain embodiments, the energy supplied to the at least one radiating element at each of the subset of frequencies or MSEs may be a function of the absorbable energy values at the plurality of frequencies or MSEs other than the frequency or MSE at which energy is supplied. For example, in the presently disclosed embodiments, the dissipation ratios at a range of "neighborhood" frequencies or MSEs around the frequency or MSE at issue may be used for determining the amount of energy to be supplied. In the presently disclosed embodiments, the entire working band excluding certain frequencies or MSEs that are associated with extremely low dissipation ratios (which may be associated with metallic materials, for example) may be used for the determination.

In certain embodiments, the processor may be configured to cause energy to be supplied to the at least one radiating element in at least a subset of the plurality of frequencies, wherein energy transmitted to the zone at each of the subset of frequencies or MSEs is inversely related to the absorbable energy value at each frequency or MSE. Such an inverse relationship may involve a general trend—when an indicator of absorbable energy in a particular frequency or MSE subset (i.e., one or more frequencies or MSEs) tends to be relatively high, the actual incident energy at that frequency or MSE subset may be relatively low. And when an indicator of absorbable energy in a particular frequency or MSE subset tends to be relatively low, the incident energy may be relatively high. The inverse relationship may be even more closely correlated. For example, in some of the presently disclosed embodiments, the transmitted energy may be set such that its product with the absorbable energy value (i.e., the absorbable energy by object 110) is substantially constant across the frequencies or MSEs applied. In either case, a plot of transmitted energy may generally appear as a reverse image of a value indicative of absorption (e.g., dissipation ratio or a product of the dissipation ratio and the maximal incident power available at each transmitted frequency or MSE). For example, FIG. 12 provides a plotted example of a dissipation ratio spectrum 210 (dashed line) and a corresponding incident power spectrum 220 (solid line) taken during operation of a device constructed and operated in accordance with the presently disclosed embodiments. The plots shown in FIG. 12 were taken with an oven having a maximum incident power of about 400 Watts, wherein a 100 gr chunk of minced beef was placed. A range of frequencies between 800 MHz and 1 GHz was swept, and energy was supplied based on the sweep, such that essentially uniform dissipation of energy will be affected in the chunk of beef.

In certain embodiments, the at least one processor may be configured to adjust energy supplied such that when the energy supplied is plotted against an absorbable energy value over a range of frequencies or MSEs, the two plots tend to mirror each other. In the presently disclosed embodiments, the two plots may be mirror images of each other. In the presently disclosed embodiments, the plots may not exactly mirror each other, but rather, have generally opposite slope directions, i.e., when the value corresponding to a particular frequency or MSE in one plot is relatively high, the value corresponding to the particular frequency in the other plot may be relatively low. For example, as shown in FIG. 12, the relationship between the plot of transmitted energy (e.g., incident power spectrum 220) and the plot of the absorbable energy values (e.g., dissipation ratio spectrum 210) may be compared such that when the transmitted energy curve is increasing, over at least a section of the curve, the absorbable energy curve will be decreasing over the same section. Additionally, when the absorbable energy curve is increasing, over at least a section of the curve, the transmitted energy curve will be decreasing over the same section. For example, in FIG. 12, incident power spectrum 220 increases over the frequency range of 900 Hz-920 Hz, while dissipation ratio spectrum 210 decreases over that frequency range. At times, the curve of transmitted energy might reach a maximum value, above which it may not be increased, in which case a plateau (or almost plateau) may be observed in the transmission curve, irrespective of the absorbable energy curve in that section. For example, in FIG. 12, when the incident power reaches the maximum value of 400 W, the incident power stays substantially constant regardless of the variations in the dissipation ratio.

Some exemplary schemes can lead to more spatially uniform energy absorption in the object 110. As used herein, "spatial uniformity" refers to a condition where the energy absorption (i.e., dissipated energy) across the object or a portion (e.g., a selected portion) of the object that is targeted for energy application is substantially constant. The energy absorption is considered "substantially constant" if the variation of the dissipated energy at different locations of the object is lower than a threshold value. For instance, a deviation may be calculated based on the distribution of the dissipated energy, and the absorbable energy is considered "substantially constant" if the deviation is less than 50%. Because in many cases spatially uniform energy absorption may result in spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, such as a temperature sensor in zone 90.

In order to achieve approximate substantially constant energy absorption in an object or a portion of an object, controller 101 may be configured to hold substantially constant the amount of time at which energy is supplied to antennas 102 at each frequency or MSE, while varying the amount of power supplied at each frequency or MSE as a function of the absorbable energy value.

In certain situations, when the absorbable energy value is below a predetermined threshold for a particular frequency, frequencies, MSE or MSEs, it may not be possible to achieve uniformity of absorption at each frequency or MSE. In such instances, consistent with the presently disclosed embodiments, controller 101 may be configured to cause the energy to be supplied to the antenna for that particular frequency, frequencies, MSE or MSEs at a power level substantially equal to a maximum power level of the device. Alternatively, consistent with some other embodiments, controller 101 may be configured to cause the amplifier to supply no energy at all at these particular frequency, frequencies, MSE or MSEs. At times, a decision may be made to supply energy at a power level substantially equal to a maximum power level of the amplifier only if the amplifier may supply to the object at least a threshold percentage of energy as compared with the uniform transmitted energy level (e.g. 50% or more or even 80% or more). At times, a decision may be made to supply energy at a power level substantially equal to a maximum power level of the amplifier only if the reflected energy is below a predetermined threshold, in order, for example, to protect the apparatus from absorbing excessive power. For example, the decision may be made based on the temperature of a dummy load into which reflected energy is introduced, or a temperature difference between the dummy load and the environment. The at least one processor may accordingly be configured to control the reflected energy or the absorbed energy by a dummy load. Similarly, if the absorbable energy value exceeds a predetermined threshold, the controller 101 may be configured to cause the antenna to supply energy at a power level less than a maximum power level of the antenna.

In an alternative scheme, uniform absorption may be achieved by varying the duration of energy delivery while maintaining the power applied at a substantially constant level. In other words, for frequencies or MSEs exhibiting lower absorbable energy values, the duration of energy application may be longer than for frequencies or MSEs exhibiting higher absorption values. In this manner, an amount of power supplied at multiple frequencies or MSEs may be substantially constant, while an amount of time at which energy is supplied varies, depending on an absorbable energy value at the particular frequency or MSE.

In certain embodiments, the at least one antenna may include a plurality of antennas, and the at least one processor may be configured to cause energy to be supplied to the plurality of antennas using waves having distinct phases. For example, antenna 102 may be a phased array antenna including a plurality of antennas forming an array. Energy may be supplied to each antenna with electromagnetic waves at a different phase. The phases may be regulated to match the geometric structure of the phased array. In the presently disclosed embodiments, the at least one processor may be configured to control the phase of each antenna dynamically and independently. When a phased array antenna is used, the energy supplied to the antenna may be a sum of the energy supplied to each of the antennas in the array.

Because absorbable energy can change based on a host of factors including object temperature, depending on application, it may be beneficial to regularly update absorbable energy values and thereafter adjust energy application based on the updated absorption values. These updates can occur multiple times a second, or can occur every few seconds or longer, depending on application. As a general principle, more frequent updates may increase the uniformity of energy absorption.

In accordance with the presently disclosed embodiments, a controller may be configured to adjust energy supplied from the antenna as a function of the frequency or MSE at which the energy is supplied. For example, regardless of whether a sweep or some other active indicator of energy absorption is employed, certain frequencies or MSEs may be targeted or avoided for energy application. That is, there may be frequencies or MSEs that the controller 101 avoids altogether, such as where the absorption level falls below a predetermined threshold. For example, metals tend to be poor absorbers of electromagnetic energy, and therefore certain frequencies or MSEs associated with metals will exhibit low absorption indicator values. In such instances the metals may fit a known profile, and associated frequencies or MSEs may be avoided. Or, an absorption indicator value may be dynamically determined, and when it is below a predetermined threshold, controller 101 may prevent an antenna 102 from thereafter supplying electromagnetic energy at such frequencies. Alternatively, if it is desirable to apply energy to only portions of an object, energy can be targeted to those portions if associated frequency thresholds are either known or dynamically determined. In accordance with another aspect of the invention, the at least one processor may be configured to determine a desired energy absorption level at each of a plurality of frequencies or MSEs and adjust energy supplied from the antenna at each frequency or MSE in order to target the desired energy absorption level at each frequency or MSE. For example as discussed earlier, the controller 101 may be configured to target a desired energy absorption level at each frequency or MSE in attempt to achieve or approximate substantially uniform energy absorption across a range of frequencies or MSEs. Alternatively, the controller 101 may be configured to target an energy absorption profile across the object 110, which is calculated to avoid uniform energy absorption, or to achieve substantially uniform absorption in only a portion of the object 110.

Modulation Space (MS) and Modulation Space Elements (MSEs)

As described above, the presently disclosed embodiments may be configured to achieve a desired energy application pattern (e.g., heating pattern) in a load, even a load that includes multiple objects, or a load that includes multiple dissipation ratios, one or more different phases of a material, and/or different material compositions. For example, by scanning a load over a range of frequencies, a dissipation ratio can be determined for each frequency. Using the dissipation ratio information, the controller 101 may be configured to target a desired energy absorption level at each frequency. In one exemplary embodiment, the level of power supplied at each frequency can be controlled such that lower power levels are supplied at frequencies that exhibit high dissipation ratios and higher power levels can be supplied at frequencies that exhibit low dissipation ratios. As a result, as described above, such an embodiment may achieve or approximate substantially uniform energy absorption across a range of frequencies and the load may be heated uniformly.

The presently disclosed embodiments, however, are not limited to the concept of frequency sweeping and applying varying levels of power at frequencies within the sweep. Rather, energy delivery consistent with the presently disclosed embodiments may be accomplished more broadly by controlling any parameters that have the potential for affecting energy delivery to the load or a portion of the load. Frequency is merely one example of a parameter that can be used to affect energy absorption by the load or a portion of the load.

Electromagnetic waves in the energy application zone may exhibit a certain field pattern. A "field pattern" may refer to an electromagnetic field configuration characterized by, for example, the amplitude of electric field intensity distribution in the energy application zone. In general, electromagnetic field intensity may be time varying and spatially dependent. That is, not only may the field intensity differ at different spatial locations, but for a given location in space, the field intensity can vary in time or may oscillate, often in a sinusoidal fashion. Therefore, at different spatial locations, the field intensities may not reach their maximum values (i.e., their maximum amplitude values) at the same time. Because the field intensity amplitude at a given location can reveal information regarding the electromagnetic field, such as electromagnetic power density and energy transfer capability, the field pattern referred to herein may include a profile representing the amplitude of field intensity at one or more spatial locations. Such a field intensity amplitude profile may be the same as or different from a snapshot of the instant field intensity distribution at a given time in the zone. As used herein, the term "amplitude" is interchangeable with "magnitude."

A field pattern may be excited by applying electromagnetic energy to the energy application zone. As used herein, the term "excited" is interchangeable with "generated," "created," and "applied." In general, a field pattern in an energy application zone may be uneven (i.e., non-uniform). That is, the field pattern may include areas with relatively high amplitudes of field intensity and other areas with relatively low amplitudes of field intensity. The rate of energy transfer may depend upon the amplitude of field intensity. For example, energy transfer may occur faster at areas with higher amplitude of field intensity than in areas with lower amplitude of field intensity. As used herein, the term "energy transfer" is interchangeable with "energy delivery."

The apparatus of FIG. 1 may be configured to control a distribution and intensity of high amplitude electromagnetic field (maxima and minima) and low amplitude electromagnetic field in the energy application zone, thus delivering differing target amounts of energy to any two (or more) given regions in the application zone. The energy application may be a modal cavity. As used herein, a "modal cavity" refers to a cavity that satisfies a "modal condition." Modal condition refers to the relationship between the largest resonant wavelength supported by the energy application zone and the wavelength of the delivered electromagnetic energy supplied by the source. If the wavelength of the delivered electromagnetic energy supplied by the source is greater than about one quarter of the largest resonant wavelength supported by the energy application zone, the modal condition is met. The control of distribution and intensity of electromagnetic field in the energy application zone can occur through the selection of "MSEs" (as described later). Choices of MSE selection may impact how energy is distributed in regions of the energy application zone. When the modal condition is not met, it may be more difficult to achieve a desired energy application distribution through the control of MSEs.

The term "modulation space" or "MS" is used to collectively refer to all the parameters that may affect a field pattern in the energy application zone and all combinations thereof. In some embodiments, the "MS" may include all possible components that may be used and their potential settings (either absolute or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings (e.g. relative power delivered at the same time to two or more irradiating feeds), time settings, phases, etc.

Examples of energy application zone-related aspects of the modulation space may include the dimensions and shape of the energy application zone and the materials from which the energy application zone is constructed. Examples of energy source-related aspects of the modulation space may include amplitude, frequency, and phase of energy delivery. Examples of radiating element-related aspects of the modulation space may include the type, number, size, shape, configuration, orientation and placement of antenna-like structures.

Figure 15:
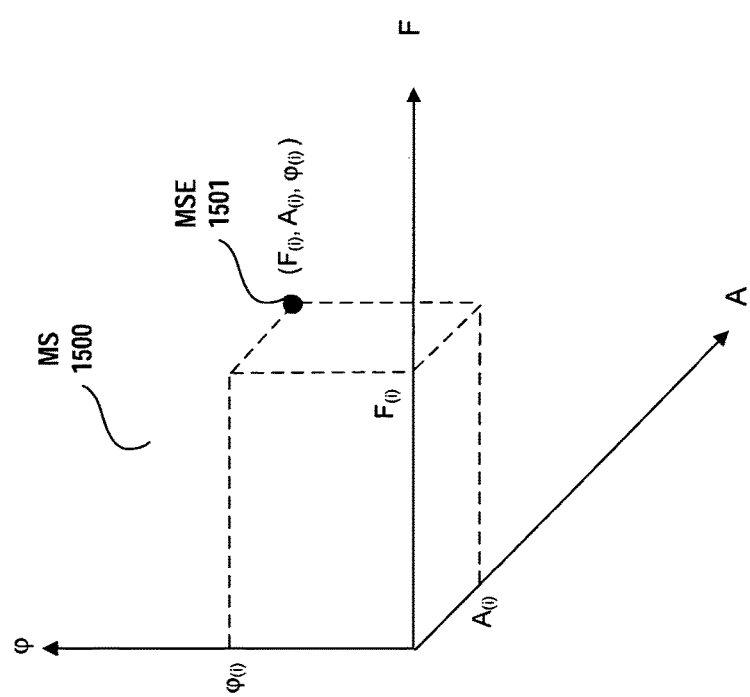
FIG. 15 illustrates an exemplary modulation space.

Each variable parameter associated with the MS is referred to as an MS dimension. By way of example, FIG. 15 illustrates a three dimensional modulation space 1500, with three dimensions designated as frequency (F), phase ($\varphi$), and amplitude (A) (e.g., amplitude between two or more feeds exciting an electromagnetic field by a given MSE). That is, in MS 1500, frequency, phase, and amplitude of the electromagnetic waves are modulated during energy delivery, while all the other parameters may be predetermined and fixed during energy delivery. An MS may also be one dimensional where only one parameter is varied during the energy delivery. An MS may also be higher-dimensional such that more than one parameter is varied.

The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, FIG. 15 shows an MSE 1501 in the three-dimensional MS 1500. MSE 1501 may have a specific frequency F(i), a specific phase $\varphi$(i), and a specific amplitude A(i). If even one of these MSE variables changes, then the new set defines another MSE. For example, (3 GHz, 30°, 12 V) and (3 GHz, 60°, 12 V) are two different MSEs, although only the phase component changes. In some embodiments, sequentially swept MSEs may not necessarily be related to each other. Rather, their MSE variables may differ significantly from MSE to MSE (or may be logically related). In some embodiments, the MSE variables differ significantly from MSE to MSE, possibly with no logical relation between them, however in the aggregate, a group of working MSEs may achieve a desired energy application goal.

Differing combinations of these MS parameters may lead to differing field patterns across the energy application zone and, in turn, differing energy distribution patterns in the object. A plurality of MSEs that can be executed sequentially or simultaneously to excite a particular field pattern in the energy application zone may be collectively referred to as an "energy delivery scheme." For example, an energy delivery scheme may consist of three MSEs ($F_{(1)}$, $\varphi_{(1)}$, $A_{(1)}$), ($F_{(2)}$, $\varphi_{(2)}$, $A_{(2)}$), ($F_{(3)}$, $\varphi_{(3)}$, $A_{(3)}$). The energy delivery scheme may comprise additional non MSE parameters, such as the time during which each MSE is applied or the power delivered at each MSE. Since there are a virtually infinite number of MSEs, there are a virtually infinite number of different energy delivery schemes, resulting in virtually infinite number of differing field patterns in any given energy application zone (although different MSEs may at times cause highly similar or even identical field patterns). Of course, the number of differing energy deliver schemes may be, in part, a function of the number of MSEs that are available. The invention, in its broadest sense, is not limited to any particular number of MSEs or MSE combinations. Rather, the number of options that may be employed could be as few as two or as many as the designer desires, depending on factors such as intended use, level of desired control, hardware or software resolution and cost.

The modulation space may include a linear space or a nonlinear space. When the modulation space is linear, the collective field pattern caused by applying two MSEs ($MSE_1$ and $MSE_2$) is the same as the field pattern caused by applying an MSE which is a combination of $MSE_1$ and $MSE_2$. By way of an example, for $MSE_1=(F_{(1)}, \varphi_{(1)}, A_{(1)})$ and $MSE_2=(F_{(2)}, \varphi_{(2)}, A_{(2)})$ in a linear modulation space 1500 as illustrated in FIG. 15, $I(MSE_1)+I(MSE_2)=I(MSE_1+MSE_2)$. Consistent with presently disclosed embodiments, the modulation space may be linear when the MSEs excite modes in the energy application zone. In other cases, the modulation space may be nonlinear, e.g., $I(MSE_1)+I(MSE_2) \neq I(MSE_1+MSE_2)$.

As noted above, an apparatus or method of the invention may involve the use of a processor for executing instructions or performing logic operations. The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of providing instructions to the processor. The processor(s) may be customized for a particular use, or can be configured for general-purpose use and perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

A single or multiple processors may be provided for the sole purpose of regulating the source. Alternatively, a single or multiple processors may be provided with the function of regulating the source in addition to providing other functions. For example, the same processor(s) used to regulate the source may also be integrated into a control circuit that provides additional control functions to components other than the source.

In accordance with some embodiments of the invention, at least one processor may be configured to regulate the source in order to deliver a first predetermined amount of energy to a first predetermined region and a second predetermined amount of energy to a second predetermined region in the energy application zone, wherein the first predetermined amount of energy is different from the second predetermined amount of energy. For example, field patterns may be selected having known areas with high amplitude of electromagnetic field intensity (hot spots). Thus, by aligning a hot spot with a region in an energy application zone, a predetermined field pattern may be chosen to deliver a first predetermined amount of energy to a first predetermined region. When another field pattern is chosen having a differing hot spot, that second field pattern may result in delivery of a second predetermined amount of energy to a second predetermined region. And as also described later, differing MSEs and/or combinations of MSEs may be chosen in order to deliver differing predetermined amounts of energy to differing predetermined regions. In either instance, control of the amount of energy applied may be achieved through either the processor's selection of particular field patterns or MSEs, and/or control of, for example, power level (e.g. a total power provided for a given MSE), a duration of time that power is applied during a particular condition, or combinations of the above. The processor may make such selections in order to achieve a desired energy application profile.

The term "region" may include any portion of an energy application zone, such as a cell, sub-volume, sub-division, discrete sub-space, or any sub-set of the energy application zone, regardless of how that subset is discretized. In one particular example, the energy application zone may include two regions. In another example, the energy application zone may include more than two regions. The regions may or may not overlap with each other, and the size of each region may or may not be the same.

The at least one processor may also be configured to predetermine the locations of the first region and the second region. This may occur, for example, through reflective feedback from the energy application zone, providing information about a location of an object in the zone. In other embodiments, this might be achieved through imaging. In some embodiments, the regions may correspond to different portions of the object, and differing targeted amounts of electromagnetic energy may be delivered to these different portions of the object. The amount of energy actually dissipated in each region may depend on the field intensity at that region and the absorption characteristics of the corresponding portion of the object at that particular region. In yet other embodiments, the predetermined locations may be a function of known geometry of a field pattern without reference to an object in the energy application zone. In some embodiments, locations of the first region and the second region may also be predetermined by a user or a device other than the at least one processor.

Two regions may be located adjacent to each other in the energy application zone. For example, the energy application zone may include a region occupied by an object or a portion of an object, and another region defining an area distinct from the area of the object. In this case, these two regions may be adjacent to each other and separated by a boundary. For example, the first region may be within the cup of soup being heated, and the second region may be outside of the cup of the soup. In another example, the energy application zone may include two regions that have different energy absorption characteristics within the object. For example, the first region may contain mostly water at the top layer of the soup, and the second region may contain mostly potatoes and/or meats towards the bottom layer of the soup. In another example, the first region may contain a material of a particular phase (e.g., liquid water), and the second region may contain the same material, but of a different phase (e.g., solid ice). Because of their differing energy absorption characteristics, it may be beneficial to excite field patterns with differing electrical field intensities at these two regions. Based on the difference in the local field intensities and the energy absorption characteristics of the two regions, the dissipated energy in each of the regions may be predetermined. Accordingly, the dissipated energy may be made substantially equal or different, as desired, across differing regions in the object, by selecting and controlling MSEs for constructing a suitable energy deliver scheme for delivering the energy.

MSE selection may impact how energy is distributed in regions of the energy application zone. In order to deliver differing targeted amounts of electromagnetic energy to differing predetermined regions in the energy application zone, the processor may control one or more MSEs in order to achieve a field pattern that targets energy to a specific predetermined region in the energy application zone. The selection of MSEs that result in standing waves may provide an added measure of control since standing waves tend to exhibit predictable and distinctly defined "high-intensity regions" (hot spots) and "low-intensity regions" (cold spots), as described earlier, where the a high-intensity region may exhibit an energy concentration that is readily distinguishable from a low-intensity region. It is to be understood that the term "cold spot" does not necessarily require a complete absence of applied energy. Rather, it may also refer to areas of diminished intensity relative to the hot spots. That is, in the high-intensity regions, the amplitude of field intensity is higher than the amplitude of field intensity in the low-intensity regions. Therefore, the power density in the high-intensity region is higher than the power density in the low-intensity region. The power density and field intensity of a spatial location are related to the capability of delivering electromagnetic energy to an object placed in that location. And therefore, the energy delivery or transfer rate is higher in a high-intensity region than that in a low-intensity region. In other words, the energy delivery or transfer may be more effective in a high-intensity region. Thus, by controlling the high-intensity regions and/or low intensity regions in the energy application zone, the processor may control the energy delivery to a specific spatial location. Such control of high- and low-intensity regions may be achieved by control of MSEs.

Figure 14:
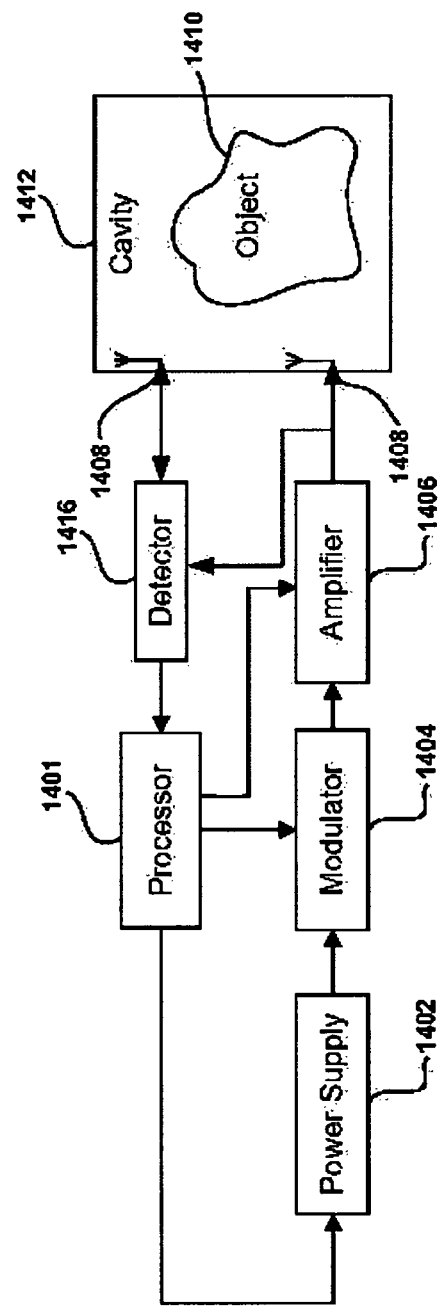
FIG. 14 represents a device in accordance with an exemplary embodiment of the present invention.

Controllable MSE variables may include one or more of amplitude, phase, and frequency of the transmitted electromagnetic wave; a location, orientation, and configuration of each radiating element; or the combination of any of these parameters, or other parameters that may affect a field pattern. For example, as depicted in FIG. 14, an exemplary processor 1401 may be electrically coupled to various components of a source, such as power supply 1402, modulator 1404, amplifier 1406, and radiating elements 1408. Processor 1401 may be configured to execute instructions that regulate one or more of these components. For example, processor 1401 may regulate the level of power supplied by power supply 1402. Processor 1401 may also regulate the amplification ratio of amplifier 1406, by switching, for example, the transistors in the amplifier. Alternatively or additionally, processor 1401 may perform pulse-width-modulation control of amplifier 1406 such that the amplifier outputs a desired waveform. Processor 1401 may regulate modulations performed by modulator 1404, and may alternatively or additionally regulate at least one of location, orientation, and configuration of each radiating element 1408, such as through an electro-mechanical device. Such an electromechanical device may include a motor or other movable structure for rotating, pivoting, shifting, sliding or otherwise changing the orientation or location of one or more of radiating elements 1408. Processor 1401 may be further configured to regulate any field adjusting elements located in the adjusting elements may be configured to selectively direct the electromagnetic energy from the radiating element, or to simultaneously match a radiating element acting as a transmitter to reduce coupling to the one or more other radiating elements acting as a receiver.

In another example, when a phase modulator is used, it may be controlled to perform a predetermined sequence of time delays on the AC waveform, such that the phase of the AC waveform is increased by a number of degrees (e.g., 10 degrees) for each of a series of time periods. Alternatively, the processor may dynamically and/or adaptively regulate modulation based on feedback from the energy application zone. For example, processor 1401 may be configured to receive an analog or digital feedback signal from detector 1416, indicating an amount of electromagnetic energy received from cavity 1412 (including object 1410), and processor 1401 may dynamically determine a time delay at the phase modulator for the next time period based on the received feedback signal.

The energy distribution that results from any given combination of MSEs may be determined, for example, through testing, simulation, or analytical calculation. Using the testing approach, sensors (e.g., small antenna) can be placed in an energy application zone, to measure the energy distribution that results from a given combination of MSEs. The distribution can then be stored in, for example, a look-up table. In a simulated approach, a virtual model may be constructed so that combinations of MSEs can be tested in a virtual manner. For example, a simulation model of an energy application zone may be performed in a computer based on a set of MSEs inputted to the computer. A simulation engine such as CST or HFSS may be used to numerically calculate the field distribution inside the energy application zone. The resulting field pattern may be visualized using imaging techniques or stored in a computer as digital data. The correlation between MSE and resulting field pattern may be established in this manner. This simulated approach can occur well in advance and the known combinations stored in a look-up table, or the simulation can be conducted on an as-needed basis during an energy application operation.

Similarly, as an alternative to testing and simulation, calculations may be performed based on an analytical model in order to predict energy distribution based on selected combination of MSEs. For example, given the shape of an energy application zone with from analytical equations. This basic field pattern, also known as a "mode," may then be used to construct a desired field pattern by linear combinations. As with the simulated approach, the analytical approach may occur well in advance and the known combinations stored in a look-up table, or may be conducted on an as-needed basis during an energy application operation.

In accordance with some embodiments of the invention, the processor may be configured to deliver predetermined amounts of energy to at least two regions in the energy application zone. The energy may be predetermined based on known characteristics of the object (a/k/a, load) in the energy application zone. For example, in the case of a dedicated oven that repetitively heats products sharing the same physical characteristics (e.g., identical hamburger patties), the processor may be pre-programmed to deliver differing known quantities of energy corresponding at least two known field patterns. The processor may apply differing amounts of energy depending on the field pattern. That is, the power or duration of energy application may be varied as a function of the field pattern being applied. (i.e., resulting from an MSE). This correlation between the predetermined amounts of energy to be applied and the field pattern may be determined by testing, simulation, or analytical analysis, as discussed previously.

The correlation between field pattern and amount of energy delivered may also be determined by the energy absorption profile of object 1410. That is, object 1410 can be scanned using one or more MSEs, and information indicative of dissipated energy for each of the one or more MSEs (e.g., corresponding dissipation ratios) can be determined. Based on the dissipation ratios and desired energy delivery characteristics, a power level can be selected for each of the scanned MSEs to achieve a desired goal. For example, if the goal is to uniformly apply energy across an object's volume, then the processor might select combinations of MSEs that result in uniform energy application. If on the other hand, non-uniform energy application is desired, then the processor might apply predetermined amounts of energy with each differing field pattern in order to achieve the desired non-uniformity. The MSEs may be grouped into subsets based on the information received indicative of dissipated energy, and each of these subsets may be associated with a power delivery protocol that can be used to regulate energy applied to the load. Just as subsets of frequencies may be selected and swept, as described in the frequency sweeping examples above, so too may subsets of MSEs be selected and swept in order to achieve a desired energy application goal. Such a sequential process may be referred to herein as "MSE sweeping." This sweeping process may be used in conjunction with any parameter used to characterize one or more MSEs (e.g., frequency, phase, amplitude, etc.). The sweeping process may include sequentially changing values associated with a single dimension in a MS, such as frequency, phase, or amplitude (e.g., the difference in amplitude between a plurality of feeds that are used within a single MSE), as illustrated in FIG. 15. Alternatively, the sweeping process may include sequentially changing more than one parameter in the MS for each step in the sweep.

Returning to FIG. 2, sweep/sense step 21 may include sweeping with any MSEs. Accordingly, step 23 may include analysis of feedback information resulting from application of any chosen MSEs. In step 23, energy may be transmitted using the same of different set of MSEs as those used in step 21.

MSE sweeping can be used to differentially heat portions or regions of an object. For example, one or more MSEs may be scanned, and the dissipation characteristics of an object or portion of a load may be determined (e.g., dissipation ratios may be determined for the scanned MSEs). Based on the dissipation characteristics of the load, a desired power level may be selected for application at each of the scanned MSEs or at a portion of the scanned MSEs. In one example, MSEs that exhibit large dissipation ratios may be assigned relatively low power values, and MSEs that exhibit smaller dissipation ratios may be assigned higher power values. Of course, any scheme for assigning power levels to scanned MSEs may be employed depending on the particular energy application goals. MSE sweeping can then be commenced during which the selected power levels are applied for a certain time at the corresponding MSEs. MSE sweeping can continue until the object has achieved the desired level of heating or a desired thermal profile.

Periodically, during MSE sweeping, the load may be re-scanned using the same or different MSEs to obtain an updated set of dissipation ratios. Based on the updated set of dissipation ratios, the power levels to be applied at each of the MSEs may be adjusted. This MSE scanning can occur at any desired rate depending on the requirements of a particular embodiment. In some embodiments, the MSE scan may be repeated at a rate of about 120 times per minute. Higher scan rates (e.g., 200/min or 300/min) or lower scan rates (e.g., about 100/min, 20/min, 2/min, 10/thawing time, or 3/thawing time) may be used. Additionally, the scans can be performed non-periodically. At times, an MSE scan sequence (e.g., one or more scans) may be performed once every 0.5 seconds or once every 5 seconds or at any other rate. Moreover, the period between scans may be defined by the amount of energy to be transmitted into the cavity and/or the amount of energy to be dissipated into the load. For example, after a given amount of energy (e.g. 10 kJ or less or 1 kJ or less or several hundreds of joules or even 100 J or less were transmitted or dissipated into the load or into a given portion of a load (e.g. by weight such as 100 g or by percentage, such as 50% of load)), a new scan may be performed.

To reiterate and further expand on the principles discussed above, the presently disclosed embodiments may include an apparatus for applying RF energy to a load. The apparatus may include at least one processor, as described above. For example, the processor may include an electric circuit that performs a logic operation on an input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The at least one processor may be configured to receive information indicative of dissipated energy for each of a plurality of modulation space elements (MSEs). For example, the information received indicative of energy dissipated by the load may include information indicative of an amount of energy absorbed by the load, an amount of energy reflected by the load, or any other suitable energy dissipation indicator, as discussed previously. In one exemplary embodiment, based on the information indicative of energy dissipated by the load, the processor may determine a dissipation ratio for each of the plurality of MSEs (or set of MSEs).

The processor may determine the dissipation ratios for the set of MSEs at any desired rate. In one embodiment, the set of dissipation ratios corresponding to the set of MSEs may be determined at a rate of at least about 120 times per minute. In other embodiments, the set of dissipation ratios corresponding to the set of MSEs may be determined at a rate of less than about 120 times per minute. The rate may depend on the nature of the object, the nature of the MSEs, the physical characteristics of the system, and the desired result to be achieved. By way of example only, in some instances a rate of more than five times per second may be desirable. In other instances a rate of less than twice per second may be desirable.

The processor may be configured to group a number of the plurality of MSEs into at least two subsets based on the information received indicative of dissipated energy. For example, MSEs that exhibit higher dissipation ratios may be grouped into one subset and MSEs that exhibit lower dissipation ratios may be grouped into another subset. The plurality of MSE's may be grouped together in any number of subsets. The processor may also be configured to associate a power delivery protocol with each of the at least two subsets wherein the power delivery protocol differs between subsets. As used herein, the term "power delivery protocol" may include any manner and/or amount by which energy is applied, such as an amount of energy, a power level, and a duration of time of energy application. The processor may determine different power delivery protocols for different subsets of MSEs. Examples for power delivery protocols may include (a) the dissipation in the load of the same amount of power via all MSEs in a group, (b) dissipation in the load of different amounts of power via different MSEs based on any form of function correlating the energy and the group members, (b) a maximal or minimal setting for power transmission for the MSEs in a given group, and more. The processor may be further configured to regulate energy applied to the load in accordance with each power delivery protocol. For example, as described above, MSEs that exhibit higher dissipation ratios may receive power at a level lower than other MSEs that exhibit lower dissipation ratios. MSEs that exhibit lower dissipation ratios may receive power at a higher level than other MSEs that exhibit lower dissipation ratios. Further, MSE's that exhibit an intermediate level of dissipation ratios may receive power according to a predetermined function that includes varying applied power level values. Of course any power level within an available range MSEs according to the requirements or energy delivery goals of a particular embodiment. Similarly, any duration of time may be assigned to any MSE during energy application.

As described above, each of the plurality of MSEs may be defined by values for any of a plurality of parameters that may affect energy delivery to a load. In one embodiment, the plurality of MSEs may be defined by values for frequency, phase, and amplitude and optionally for other dimensions. In other embodiments, the MSEs may be one dimensional such that only one parameter varies and any others remain constant. For example, a set of one dimensional MSEs may differ from each other in only one of frequency, phase and amplitude. In certain embodiments, the frequency values may vary among a plurality of MSEs, while values for other parameters, such as phase and/or amplitude remain constant.

The power delivery protocol associated with each of a plurality of MSEs can be chosen according to any desired energy delivery scheme. In one embodiment, a power level corresponding to a MSE associated with a first dissipation ratio will be lower than a power level corresponding to a MSE associated with a second dissipation ratio that is lower that the first dissipation ratio.

The disclosed embodiments may also include a cavity for receiving the load and at least one radiating element for directing EM energy to the load. Further, the apparatus may include a generator of EM energy for supplying EM energy to the load via the at least one radiating element.

The presently disclosed embodiments may also be used to apply energy to materials that include a plurality of phases of matter (e.g., more than one of a solid, liquid, gas, and plasma). In such embodiments, the processor may be configured to determine a value of an energy dissipation characteristic associated with the material and regulate energy transfer to the material based on the value of the energy dissipation characteristic, such that a phase of a first type located in one region of the material receives more energy than a phase of a second type located in another region of the material. As used herein, the term "energy dissipation characteristic" may include a dissipation ratio, an indicator of energy reflected, an indicator of energy absorbed, or any other direct or indirect indicator of the load's ability to dissipate energy In certain embodiments, a gas may include steam, a solid may include ice, and a liquid may include water. However, it is contemplated that the disclosed embodiments may be used with solids other than ice, liquids other than water, and gases other than steam.

In other embodiments, the processor may be configured to regulate application of RF energy to selectively apply energy to a first portion of the material having the first phase of matter, and to selectively limit energy applied to a second portion of the material having the second phase of matter. For example, the processor can be configured to selectively apply energy to a region of the material that includes a solid phase and may selectively limit energy application in another region of the material that includes a liquid phase. Thus, the amount of energy supplied to a first portion of the material (e.g., the region including the solid) may be different from an amount of energy applied to a second portion of the material (e.g., the region including the liquid). In this manner of selective energy application for example, ice can be melted while energy application to regions of the material not containing ice may be selectively limited.

Regulation of energy transfer may occur, for example, based on feedback from the load as described earlier, and thereafter adjusting the power delivered (e.g., either amplitude, time or both) for differing MSEs in order to achieve a desired result. The regulation may vary depending on intended use. For example, if uniform energy application is desired, the regulation of energy transfer will be different from a situation where it is desired to selectively apply energy to only certain portions of a load.

In some presently disclosed embodiments, after receiving information indicative of energy absorbable by the material (e.g., an amount of reflected energy compared to an incident energy level) the processor may select a plurality of field patterns for delivering energy to the load. These field patterns may be selected, for example, according to energy absorption characteristics associated with each field pattern. Field patterns that result in high dissipation ratios, for example, may include higher intensity regions (e.g., hot spots) that have more of an overlap with more highly energy absorbent materials or material phases than field patterns associated with lower dissipation ratios. Based on the energy absorption characteristics of these field patterns, the processor may be configured to selectively assign power delivery protocol to each of a plurality of field patterns.

In embodiments where energy is applied to a material including a plurality of phases of matter, energy transfer to the material may cause a conversion of the phase of the first type to the phase of the second type. For example, the energy transfer may cause ice to melt into water. In certain embodiments, the processor may be configured to terminate energy transfer when the conversion is substantially complete. This may occur, for example, when feedback from the load indicates that substantial amounts of ice are no longer present in the load. Known imaging techniques might provide such feedback, or, since differing phases of matter may exhibit differing absorption (and reflection) characteristics, the feedback may be related to an amount of energy reflected from the load or reflected from the energy application zone in general, or may be related to any other indicator of energy absorption.

The presently disclosed embodiments may include an apparatus for applying RF energy to a load, where the apparatus includes at least one processor configured to determine a plurality of dissipation ratios associated with the load and to set frequency/power pairs (as described in detail above) based on the plurality of dissipation ratios. The processor may also be configured to regulate application of the frequency/power pairs to apply energy to the load. For example, the processor may be configured to set the frequency/power pairs such that a frequency associated with a first dissipation ratio will be assigned a power level lower than a second frequency associated with a second dissipation ratio, when the first dissipation ratio is higher than the second dissipation ratio. In another embodiment, the processor may be configured to set the frequency/power pairs such that a rate of energy transfer into the load at a frequency having a dissipation ratio of at least 0.7 is 50% or less than a rate of energy transfer into the load at a frequency having a dissipation ratio of less than 0.4.

Example of Multi-Food Heating Experiment

Dissipation properties of some foods and food types are known at various conditions and frequencies. See for example Bengtsson, N. E. & Risman, P. O. 1971. "*Dielectric properties of food at 3 GHz as determined by a cavity perturbation technique. II. Measurements on food materials.*" J. Microwave Power 6: 107-123. Such known values (for food or any other load), or using various techniques to estimate or measure the dissipation ratio at different frequencies for a plate (or load) combination, are optionally used to provide differential heating for different objects (e.g., foodstuffs), for example as shown in the following example, which was aimed at controlling the relative heating of different loads:

Both heating processes were performed using a 900 Watt device with a working band at 800-1000 MHz, constructed and operated substantially according to an embodiment of WO07/096878 ('878);

Cooked rice and raw thigh of chicken were placed together on a conventional household plate and heated according to one of the following protocols:

Protocol 1: Heating is limited to frequencies having a relatively high dissipation ratio, but an essentially uniform energy transfer is performed in all transmitted frequencies. In this specific protocol, as ep(f) normally correlates with the dissipation ratio, transmission of a homogeneous amount of energy (or power) was performed in the 30% of the frequencies having the highest ep(f). In addition, transmission was performed in all frequencies having at least 80% of the lowest ep(f) of said 30% of the frequencies. It should be noted that also in other protocols described herein, the separation of frequencies into sets corresponding to portions may be according to percentage, rather than a threshold.

Figure 9:
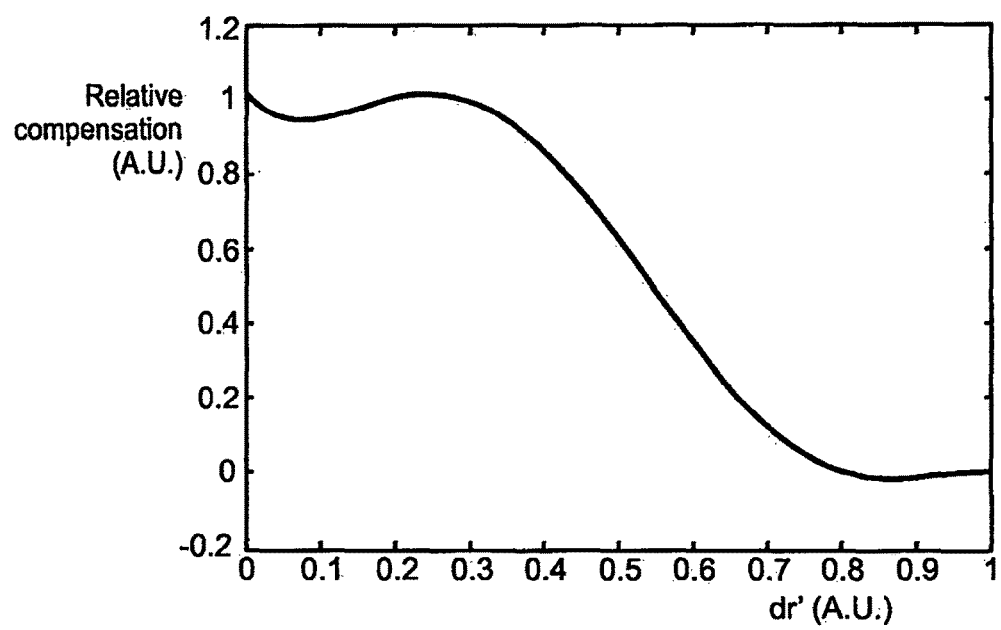
FIG. 9 shows an exemplary alternative to the example of FIG. 3.

Protocol 2: Maximal transmission is performed at frequencies having about 30% or less normalized dissipation ratio (dr') and no transmission at frequencies having 80% or more normalized dissipation ratio, with an approximately linear relation in-between. A graph showing the exact function used is attached herewith as FIG. 9.

Temperature was measured before ($T_0$) and after heating ($T_1$; $\Delta T = T_1 - T_0$). In the chicken, several places were probed, and after heating some variation of temperatures was observed. In the rice, the temperature was the same wherever probed. The results are summarized in the table below:

| Protocol | Plate composition | $T_0$ (° C.) | $T_1$ (° C.) | $\Delta T$ |
|---|---|---|---|---|
| 1 | 100 g chicken | 12 | 70-77 | 58-65 |
|  | 160 g rice | 11 | 47 | 36 |

-continued

| Protocol | Plate composition | $T_0$ (° C.) | $T_1$ (° C.) | $\Delta T$ |
|---|---|---|---|---|
| 2 | 105 g chicken | 14 | 66-70 | 52-56 |
|  | 160 g rice | 11 | 72 | 61 |

As seen above, in Protocol 1 the chicken heated to a much higher extent than the rice, while in Protocol 2, heating was more uniform between the two foods, with the rice heating slightly more than the chicken. A similar result was obtained in repeat experiments. It should be noted that either result may be desired, depending on the circumstances (e.g., user preference).

Figure 10:
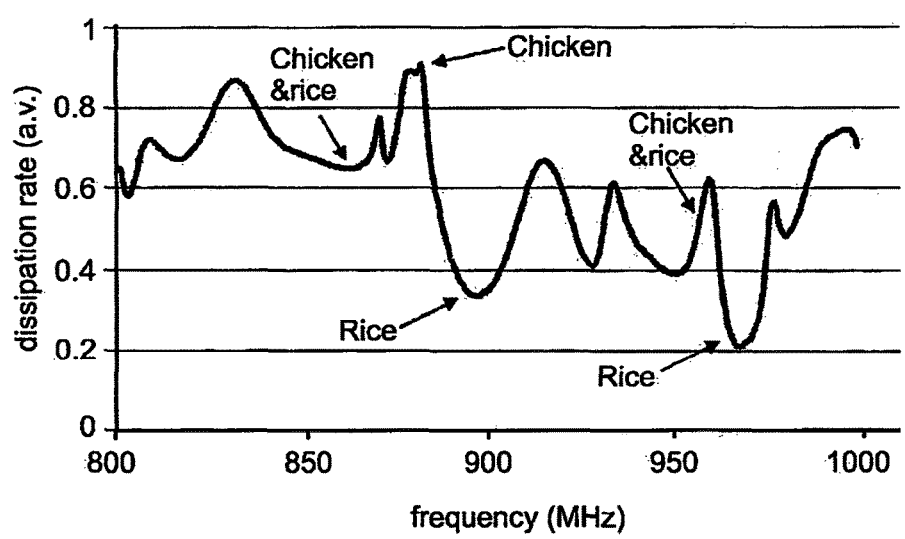
FIG. 10 shows different dissipation ratios for a mixture of rice and chicken.

FIG. 10 is a chart showing the normalized dissipation ratio measured in the device cavity for a rice & chicken plate at different frequencies in the heating experiment shown for Protocol 2 above. As heating progresses, and as the position and/or location of the load changes during heating, the measured dissipation ratios can change. Nonetheless, a first approximation is that for the higher dissipation ratio frequencies, most of the energy dissipates in the high dissipation ratio portion of the load (chicken in the instant example) and for the lower dissipation ratio frequencies, most of the energy dissipates in the low dissipation ratio portion of the load (in this example—rice).

Thus, when protocol 1 was used, heating was mainly at high dissipation ratio frequencies, thereby heating mainly the chicken; when Protocol 2 was used, heating was mainly at low dissipation ratio frequencies (but with a varying amount also in interim dissipation ratio frequencies) thereby heating the rice slightly more than the chicken.

Exemplary Variations

In an exemplary embodiment of the invention, the above methods can be used not only to avoid reaching a certain temperature, but additionally or alternatively, to minimize a time within a temperature window. For example, some temperatures may encourage bacterial growth or food degradation if maintained. For example, the above methods may be used to ensure that a lower limit of the temperature window is not reached, but is approached, by all the load and then relatively rapid heating applied until an upper limit of the temperature window is passed.

While the above have been described as methods of determining a complete irradiation profile, the above methods may also be used otherwise. For example, the above hpl calculation may be used as a limit that is applied after other irradiation profiles are selected, for example, as a safety measure to avoid runaway heating. In another example, frequency bands may be selected to have no power transmitted therein to prevent boiling of water, and this selected being applied to an otherwise determined method of frequency/power sets.

Optionally, after a portion reaches a target heat and/or is thawed, energy provision is not stopped (or, in some cases, set to lpl), but rather selected to ensure that the portion does not re-crystallize and/or stays at a desired temperature. As can be apperceived, once it is known that the portion thawed, a power level that has a desired temperature effect on that portion may be calculated form physical consideration or using a look up table.

EXAMPLES

The following non-limiting examples illustrate the application of some exemplary embodiments of the invention and should not be taken as being necessarily limiting. In the following experiments, a single frozen object at a time (as detailed below) was placed for defrosting in a cavity of an oven having three input antennas within a cylinder shaped cavity, working at 0.9 kW., and spectral information was obtained.

Figure 6:
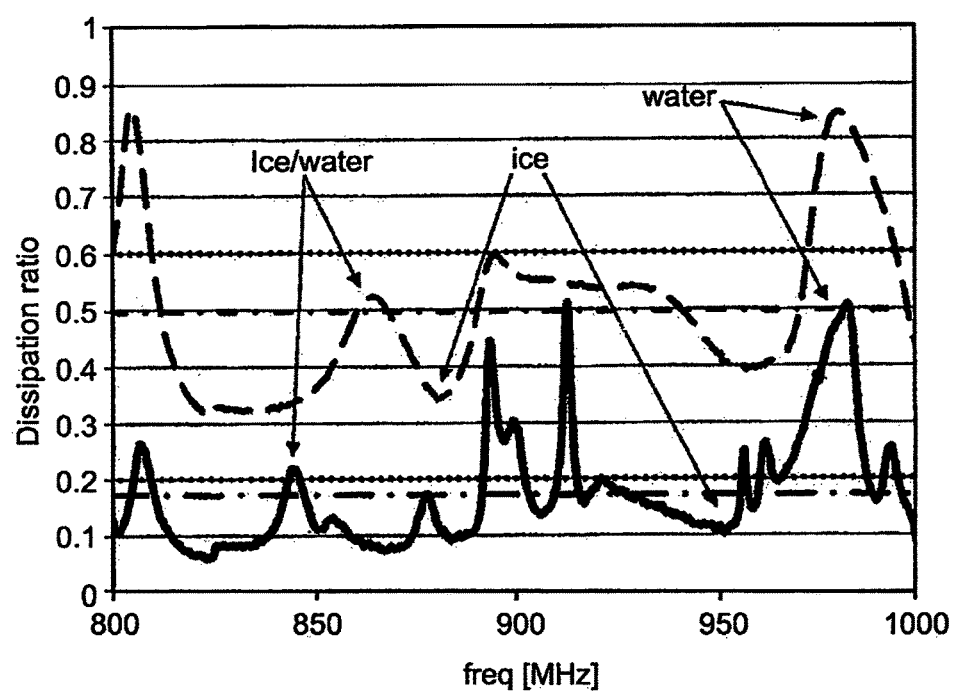
FIG. 6 is a chart showing measured dissipation ratios, in average and at various frequencies for bovine flesh and tuna fish flesh having the same mass.

FIG. 6 is a graph showing the spectral information obtained with a frozen (−20° C.) 790 gr cut of bovine sirloin (dashed line) and the spectral information obtained with a frozen (−20° C.) 790 gr portion of tuna fish (solid line). Also shown (dot-dash line) are the average dissipations calculated from the spectral information, with the average dissipation for the meat appearing at about 0.5 and the fish at about 0.17. The dotted lines depict the maximal and minimal allowed values for hpl (which is typically a function of the device and not the load). Some examples of places where the dissipation ratio indicates ice, water or ice/water are marked.

Figure 7:
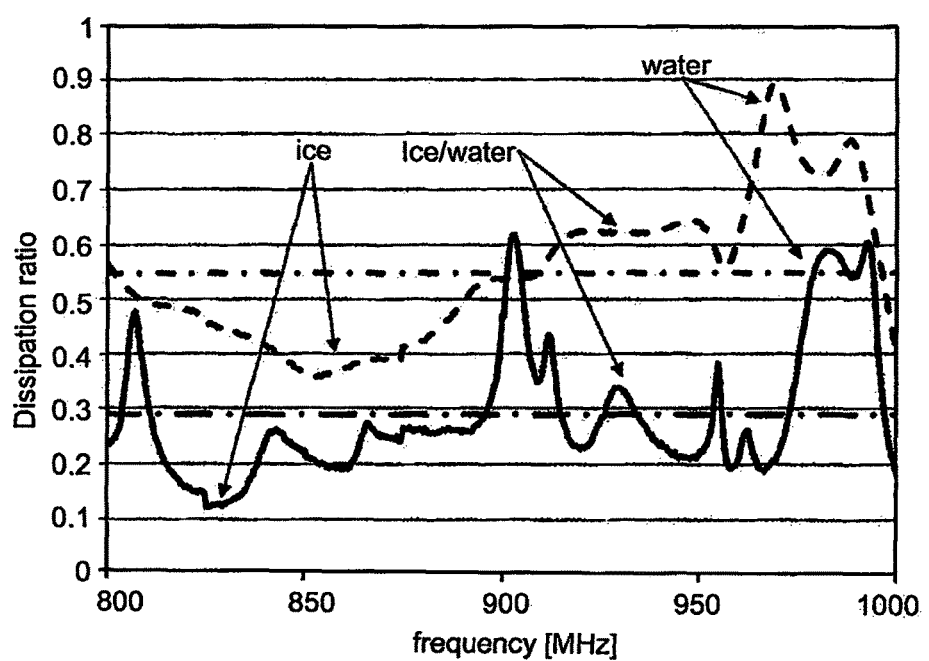
FIG. 7 is a chart showing measured dissipation ratios, in average and at various frequencies for a large chicken and for a small chicken.

FIG. 7 shows the spectral information obtained with a frozen (−20° C.) 1,250 gr chicken (dashed line) and the spectral information obtained with a frozen (−20° C.) 450 gr chicken (solid line). Also shown (dot-dash line) are the average dissipations calculated from the spectral information, with the average dissipation for the larger chicken appearing at about 0.55 and the smaller chicken at about 0.29.

As seen in the graphs, the dissipation at each frequency, as well as average dissipation, is affected inter alia by the composition of the load (e.g. meat v. fish, with different fat/protein/water ratios) and its size (with a larger chicken having more liquid water to absorb RF energy at frequencies where absorption is relatively low).

General

Following is a list of applications and publications describing RF ovens and methods which may be used with the methods and apparatus described herein:

| Title | Country | Ser. No. |
|---|---|---|
| DRYING APPARATUS AND METHODS AND ACCESSORIES FOR USE THEREWITH | PCT | IL2008/000231 |
| ELECTROMAGNETIC HEATING | PCT | IL2007/000235 |
| FOOD PREPARATION | PCT | IL2007/000864 |
| RF CONTROLLED FREEZING | PCT | IL2007/001073 |
| A METHOD AND A SYSTEM FOR A MODULAR DEVICE | USA | 61/064,201 |
| DYNAMIC IMPEDANCE MATCHING IN RF RESONATOR CAVITY | USA | 12/230,431 |
| ELECTROMAGNETIC HEATING | USA | 12/153,592 |

In the above description, different frequencies were described as having different power transmitted there. Such power differentiation can be of several types, including one or more of: different peak power, different duty cycle and/or different rate (e.g., power is supplied at fix amplitudes, but at different rate and/or delays between pulses for different frequencies) and/or at different efficiencies (e.g., transmitted in a configuration where more power is reflected back to the feed. In another example, power is provided in sweeps and for each sweep power is provided at a frequency or not, depending on the total power to be delivered at that frequency. In another example, power is provided as multi-frequency pulses, with each pulse including power in a plurality of frequencies; the frequencies in each pulse and/or amplitude of the power for a frequency in a pulse may be selected to apply a desired average power.

In general, the term "power" is used to describe the power provided as an average over time (e.g., the time between sweeps).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein the term "about" refers to ±10.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

While the present invention has been described mainly in the context of thawing, the methods of the present invention, possibly at a higher frequency, can be used for baking and cooking or any other form of heating (not limited to kitchens), areas in which conventional microwave ovens are notoriously weak. In one example, when you heat a cheese pastry, the cheese heats faster than the pastry which may be rich in oils and the methods described above may be applied to ensure even heating. Another example is heating a sandwich with a more dissipating filling (e.g., meat, cheese, vegetables), in a manner which heats the sandwich and not the filling (or merely thaws the filling. Other examples include a dish of fish and salad (e.g., heat the fish/meat but not the vegetables) or a dish with meat or fish and rice/pasta (e.g., heat the rice more than the fish or vice versa, as shown above).

What is claimed is:

1. A method of heating an object by applying to the object radio frequency (RF) energy at a plurality of modulation space elements, the method comprising:
   determining, for each of the plurality of modulation space elements, a value indicative of energy absorbable by the object; and
   applying RF energy to the object based on the values respectively determined for the plurality of modulation space elements, including:
      providing a first energy absorption threshold; and
      avoiding applying RF energy at one or more of the plurality of modulation space elements, wherein the one or more values respectively determined for the one or more of the plurality of modulation space elements are above the provided first energy absorption threshold.

2. The method of claim 1, wherein each modulation space element is a set of one or more values selected from a group consisting of one or more phase values, one or more relative amplitude values, and one or more frequency values of electromagnetic waves to be applied to the object.

3. The method of claim 2, wherein at least two of the plurality of modulation space elements differ from each other by at least a phase value.

4. The method of claim 2, wherein at least two of the plurality of modulation space elements differ from each other by at least a relative amplitude value.

5. The method of claim 2, wherein at least two of the plurality of modulation space elements differ from each other by at least a frequency value.

6. The method of claim 1, further comprising:
   selecting a maximum power that does not cause heating over a predetermined level when the maximum power is absorbed by the object; and
   applying RF power to the object at a subset of the plurality of modulation space elements, wherein the RF power absorbed at each of the modulation space elements in the subset is below the maximum power.

7. The method of claim 6, wherein applying RF power to the object at the subset of the plurality of modulation space elements further comprises:

applying different RF power to the object at different modulation space elements in the subset.

8. The method of claim 6, wherein selecting the maximum power further comprises:

selecting the maximum power as a function of spectral information of the object.

9. The method of claim 1, further comprising:

repeating the step of determining the values and the step of applying the RF energy to the object.

10. The method of claim 1, further comprising:

avoiding applying RF energy at at least one of the plurality of modulation space elements, wherein the at least one value determined for the at least one modulation space element is below a second threshold level, the second threshold level being lower than the provided first energy absorption threshold.

11. An apparatus for heating an object by applying to the object radio frequency (RF) energy at a plurality of modulation space elements, the apparatus comprising:

a processor configured to:

determine, for each of the plurality of modulation space elements, a value indicative of energy absorbable by the object;

provide a first energy absorption threshold; and avoid application of RF energy at one or more of the plurality of modulation space elements, wherein the one or more values respectively determined for the one or more of the plurality of modulation space element are above the provided first energy absorption threshold.

12. The apparatus of claim 11, wherein the processor is further configured to cause application of RF energy to the object based on the values respectively determined for the plurality of modulation space elements.

13. The apparatus of claim 11, wherein each modulation space element is a set of one or more values selected from a group consisting of one or more phase values, one or more relative amplitude values, and one or more frequency values of electromagnetic waves to be applied to the object.

14. The apparatus of claim 13, wherein at least two of the plurality of modulation space elements differ from each other by at least a phase value.

15. The apparatus of claim 13, wherein at least two of the plurality of modulation space elements differ from each other by at least a relative amplitude value.

16. The apparatus of claim 13, wherein at least two of the plurality of modulation space elements differ from each other by at least a frequency value.

17. The apparatus of claim 11, wherein the processor is further configured to:

select a maximum power that does not cause heating over a predetermined level when the maximum power is absorbed by the object; and cause application of RF power to the object at a subset of the plurality of modulation space elements, wherein the RF power absorbed at each of the modulation space elements in the subset is below the maximum power.

18. The apparatus of claim 17, wherein the processor is further configured to cause application of different RF power to the object at different modulation space elements in the subset.

19. The apparatus of claim 17, wherein the processor is further configured to select the maximum power based on spectral information of the object.

20. The apparatus of claim 11, wherein the processor is further configured to avoid application of RF energy to the object at at least one of the plurality of modulation space elements, wherein the at least one value determined for the at least one modulation space element is below a second threshold level, the second threshold level being lower than the provided first energy absorption threshold.

* * * * *